(12) United States Patent
Janssen et al.

(10) Patent No.: US 6,482,488 B1
(45) Date of Patent: Nov. 19, 2002

(54) REPAIRED SCRATCHED AND/OR ABRADED TRANSPARENT SUBSTRATES HAVING PROTECTIVE REMOVABLE SHEETS THEREON AND A METHOD OF MAKING

(75) Inventors: Jeffrey R. Janssen, Woodbury; Albert I. Everaerts, Oakdale; Donald R. O'Keefe, Roseville; William F. Sheffield, Oakdale, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/181,198

(22) Filed: Oct. 28, 1998

(51) Int. Cl.[7] ................................. B32B 9/00
(52) U.S. Cl. ................ 428/40.1; 296/95.1; 428/40.4; 428/41.5; 428/41.7; 428/41.8; 428/131; 428/194; 428/202; 428/203; 428/908.8
(58) Field of Search ................ 428/40.1, 40.4, 428/41.5, 41.7, 41.8, 194, 203, 202, 131, 908.8; 296/95.1

(56) References Cited

U.S. PATENT DOCUMENTS

| | | | |
|---|---|---|---|
| 3,785,102 A | 1/1974 | Amos | 52/173 |
| 4,301,193 A | 11/1981 | Zuk | 427/140 |
| 4,332,861 A | 6/1982 | Franz et al. | 428/520 |
| 4,842,919 A | 6/1989 | David et al. | 428/40 |
| 5,002,326 A | 3/1991 | Westfield et al. | 296/95.1 |
| 5,104,929 A | 4/1992 | Bilkadi | 524/347 |
| 5,194,293 A | 3/1993 | Foster | 427/512 |
| 5,512,116 A | 4/1996 | Campfield | 156/94 |
| 5,592,698 A | 1/1997 | Woods | 2/424 |
| 5,633,049 A | 5/1997 | Bilkadi et al. | 427/487 |

FOREIGN PATENT DOCUMENTS

| | | |
|---|---|---|
| DE | 36 37 188 A1 | 5/1988 |
| EP | 0 671 258 A2 | 9/1995 |
| GB | 2310862 | 9/1997 |
| JP | 62-53832 | 3/1987 |
| JP | 62-53832 A2 | 9/1994 |
| JP | HEI 10-167765 A2 | 6/1998 |

OTHER PUBLICATIONS

JP 62–53–832 English Abstract, 1987.
Research Disclosure 24109 (May 1984).
Boor, *Ziegler–Natta Catalysts and Polymerizations*, "Polymerization of Monomers," Ch. 19, pp. 512–562, Academic, 1979.

(List continued on next page.)

Primary Examiner—Nasser Ahmad
(74) Attorney, Agent, or Firm—Scott R. Pribnow

(57) ABSTRACT

This invention relates to a method of repairing one or both sides of an optically damaged substrate such as rigid glass or plastic window, signage or displays. The invention also relates to the repaired substrates.

This invention also relates to an article comprising a transparent stack of sheets that may be applied, for example, to protect said repaired substrates such as glass or plastic windows, signage or displays. A topmost sheet can be peeled away after it is damaged to reveal an undamaged sheet below. The invention also relates to the protected substrates and a method of protecting substrates such as glass or plastic windows, signage and displays from vandalism or other surface damage by adhering the stack of sheets to the substrate to be protected and subsequently pulling a topmost sheet away from the stack after it becomes damaged.

20 Claims, 11 Drawing Sheets

OTHER PUBLICATIONS

ASTM D1004–94a Standard Test Method for Initial Tear Resistance of Plastic film and Sheeting.

ASTM D1003–97Standard Test Method for Tensile Properties of Thin Plastic Sheeting.

ASTM D1003–97 Standard Test Method fo Haze and Luminous Transmittance of Transparent Plastics.

ASTM D1044–94 Standard Test Method for Resistance of Transparent Plastics to Surface Abrasion.

Transit Cooperative Research Program, Transportation Research Board, National Research Council, *Enhancement of Vehicle Window Glazing for Vandal Resistance and Durability*, UDR–TR–95–119, Chapters 1–3, pp. 1–11, University of Dayton Research Institute, Mar. 1996.

Transit Cooperative Research Program, Transportation Research Board, National Research Council, *Procurement Specification Guidelines for Mass Transit Vehicle Window Glazing*, UDR–TR–95–114, University of Dayton Research Institiute, Mar. 1996.

*3M™ Pat It™ Lint and Pet Hair Remover 836–D*, http://www.mmm.com/market/omc/catalog/products/p00/p21/p23.html, Sep. 1, 1998.

*The Word Is Out*, Product Data Sheet 70–0705–7091–9 (75.5)CG, 3M, 1995.

*New 3M Pat–it™ Pet Hair Remover*, Product Data Sheet 70–0705–7038–0(524)BE, 3M, 1994.

*3M Pat–it™ Lint and Pet Hair Remover*, Product Data Sheet 70–0705–0819–0, 3M, 1996.

*3M™ Scotchtint™ Sun Control Window Film*, 70–0703–7229–0, Sep. 1996.

*3M Scotchlite™ Premium Protective Overlay Film Series*, Product Data Sheet 1160 75–0300–4984–7(117.5)ii, 3M, Nov. 1997.

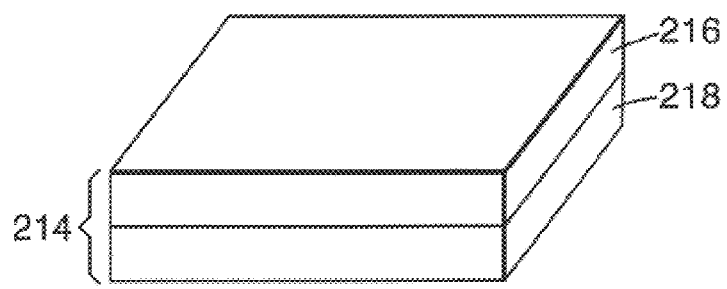
Fig. 4
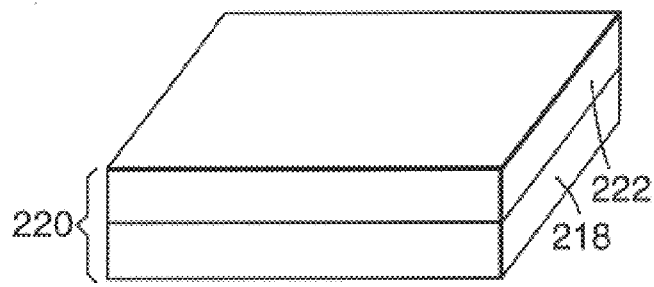
Fig. 5
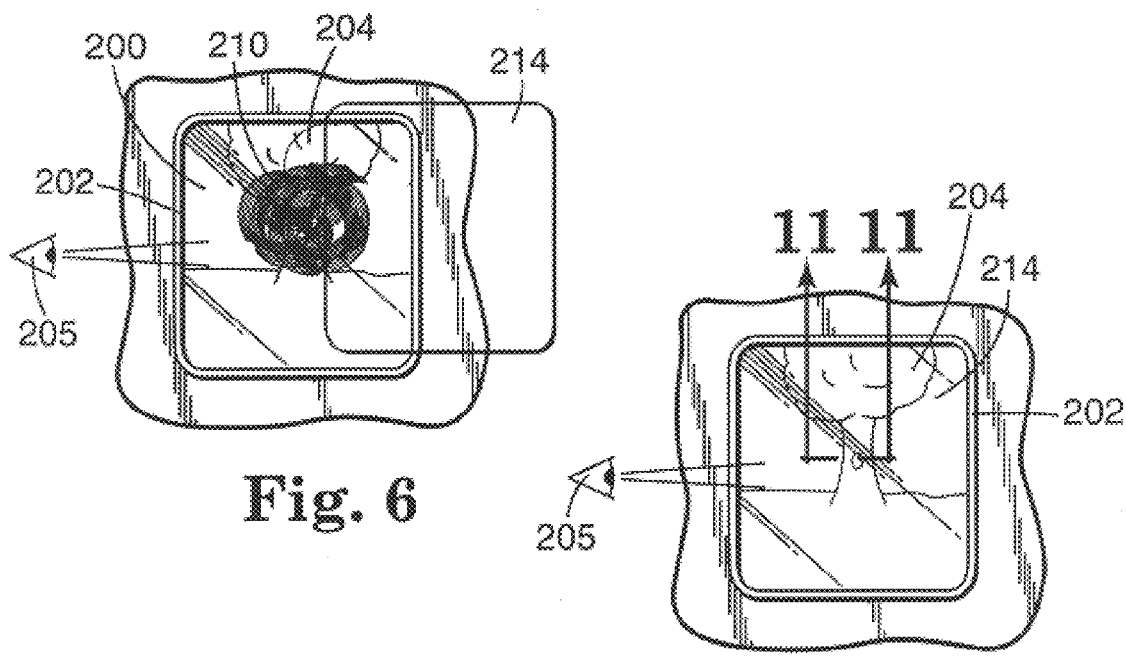
Fig. 6
Fig. 7

REPAIRED SCRATCHED AND/OR ABRADED TRANSPARENT SUBSTRATES HAVING PROTECTIVE REMOVABLE SHEETS THEREON AND A METHOD OF MAKING

FIELD OF THE INVENTION

This invention relates to a method of repairing one or both sides of an optically damaged substrate such as rigid glass or plastic window, signage or displays. The invention also relates to the repaired substrates.

This invention relates also to an article comprising a transparent stack of sheets that may be applied, for example, to protect above repaired substrates such as glass or plastic windows, signage or displays. A topmost sheet can be peeled away after it is damaged to reveal an undamaged sheet below. The invention also relates to a method of protecting repaired substrates such as glass or plastic windows, signage and displays from vandalism or other surface damage by adhering the stack of sheets to the substrate to be protected and subsequently pulling a topmost sheet away from the stack after it becomes damaged.

BACKGROUND OF THE INVENTION

Windows and glass in public transportation vehicles such as buses or subway trains can be subjected to a tremendous amount of abuse. The windows can be damaged by both incidental scratching during cleaning or they can be maliciously damaged by vandalism. Vandals damage the windows by scratching or abrading the surface of the window with items such as lava rock, diamonds, abrasive papers or abrasive cloths. Vandals can also damage the window by painting or coloring the surface of the window. Cleaning processes have been defined to eliminate damage by painting or coloring. However, scratching of glass by vandals presents a significant problem. In one major city for example, approximately 40 percent of the bus windows have been vandalized by scratching and close to 80 percent of the subway train windows. The public transportation officials now call this type of graffiti "scratchiti". The best approach to stopping graffiti historically has been is to remove the graffiti immediately from the damaged area. This graffiti prevention system which is known as "zero tolerance", has been extremely successful in eliminating the written and painted vandalism. The scratched glass however is extremely difficult and expensive to repair and as a result, the zero tolerance approach to scratchiti prevention and elimination is cost prohibitive. The vandalism issue tarnishes the overall image of an entire city's transportation system. The vandalized glass leads to lower ridership because of the reduced perception of safety on the vehicle by the public. The vandalism ultimately leads to lost revenue for the public transportation system and substantially high repair costs. A cost effective method of restoring the window to its original appearance is needed.

Several approaches have been evaluated to restore the windows to its original appearance. The first approach has been to repair the glass by a multi-step abrasion/polishing method to remove the scrachiti. The abrasion steps remove glass to the depth of the scratch with diamond abrasives and then with subsequently finer grades of diamond or aluminum oxide abrasives the surface of the glass is polished to its original appearance. The abrasive materials are expensive and the time required to completely abrade and polish the surface of the glass can be 6–8 hours depending on the depth of the damaged areas.

The second approach commonly used to repair and protect windows from scratches is to coat the damaged window with an epoxy coating (Enhancement of Vehicle Glazing for Vandal Resistance and Durability by Daniel R. Bowman, Mar. 25, 1996, available from the United States Transportation Research Board). The damaged window is typically first scrubbed clean before coating with an epoxy coating. The epoxy coating is used to fill the defects on the windows and restore the window to a state of clarity where signs can be read through the window. To apply the coating, the window must be removed from the vehicle and the window must be cleaned and primed. The coatings are applied and cured in a clean environment. The coatings currently available however are easily scratched by the same method used to scratch the glass. Once the coating is damaged, it is difficult to apply a subsequent coating due to poor adhesion of the coating to the first layer. The process to replace the damaged coating with a new coating is time consuming and expensive.

U.S. Pat. No. 4,301,193 disclosed a method of removing scratches and impregnated dirt from transparent plastic article by applying a polishing formulation containing a mild abrasive to a surface to be treated, polishing the surface with a soft material and applying to the polished surface a liquid silicone formulation and wiping the surface with dry soft material.

U.S. Pat. No. 5,194,293 discloses a method for restoring weathered plastic surfaces and for enhancing resistance of the treated surface to sunlight by cleaning the surface, polishing with a mild abrasive, applying a first layer of an uncured adhesive material that is ultraviolet curable and applying an outer coat of a compatible curable adhesive over the uncured to form a semi-permanent outer surface on the article. Curing is initiated by exposure to ultraviolet radiation.

GB 2310862 discloses a resin formulation for repairing a transparent glass member e.g. an automobile windscreen. The fluid resin is injected into a crack, which mixes with the trapped air in the damaged area. A device withdraws the fluid resin and trapped air, separates resin and trapped air and reinject separated resin in the cracked area. Repeated injections are possible because the resin has a select viscosity.

U.S. Pat. No. 5,512,116 discloses a method of repairing an automobile windscreen by inserting a first resin of selected viscosity into the surface portions of the crack and then inserting a second resin of selected viscosity which is higher than the first into the remainder of the crack.

Another approach to eliminating the problem has been to apply a single permanent adhesive coated polyester sheet onto the surface of the window. The polyester sheet is thick enough to protect the window from scratching by diamonds, lava rocks and most abrasives. The sheet is typically applied onto the glass with a water solution to eliminate any trapped air. The application process takes about 5 to 10 minutes to complete. The sheet does a good job of protecting the window from most of the damage but the sheet is readily damaged and the damage is visible to the passengers. Removing the sheet is very time consuming taking about 15 to about 60 minutes depending on the amount of residue left on the window after removal of the sheet. Once the damaged sheet is removed, a new permanent adhesive coated polyester sheet needs to be applied. The time required to remove the adhesive coated polyester sheet, remove the adhesive residue from the glass, and apply a new permanent adhesive coated polyester sheet and reinstall the window can be close to 2 hours. Examples of single permanent adhesive coated polyester sheets which can be used to protect a window are 3M™ Scotchshield™ Safety and Security Window Film and 3M™ Sun Control Window Films, data sheet number 70-0703-7220-0 published in September 1996 by the 3M Company.

The replaced sheet can be quickly damaged once the vehicle is used again in public thus necessitating another costly and time consuming replacement.

Another approach to the problem is to apply a sacrificial window as a shield over an original non-damaged window. The vehicle's window is modified with a frame that has a channel designed for a sheet of polycarbonate or acrylic. The rigid self-supporting sheet is inserted into the channel and acts as a barrier to damage on the base window. The polycarbonate sheet can be easily scratched by intentional methods being used to scratch the glass. This approach requires extensive modification to the window frame. Furthermore, the material cost per repair can be excessive making this approach cost prohibitive.

U.S. Pat. No. 3,785,102 discloses a pad comprising a plurality of very thin polyethylene or polypropylene removable sheets, each sheet bearing a very thin coating of pressure sensitive adhesive on its top surface for removing dirt from shoes and an adhesive at the bottom surface so that each successive layer is removably adhered to successive bottom layers and eventually to the floor. There is no discussion regarding the clarity of such a pad.

3M Masking and Packaging Systems Division sells a stack of sheets with adhesive that removes lint and pet hair under the trade names Pat It™ Lint and Pet Hair Remover, product data sheet numbers 70-0705-7091-9, 70-0705-0819-0 and 70-0705-7038-0 published by 3M Company in 1994.

Research Disclosure 24109 (May 1984) discloses transmissive strippable plastic sheets stacked on mirror surfaces or stacked reflective (mirror surfaced) strippable plastic sheets that can be removed successively as toner or dust build up on the mirrors used in the optical imaging systems of electrophotographic reproduction apparatus occurs. The adhesive joining the layers to one another are provided only about the border areas of the sheets which are outside the optical image path to minimize image quality losses.

JP 10167765A describes a method of cleaning windows by the application of an optically clear sheet of plastic film on the inner and outer surface of the glass. The film is comprised of polyvinyl chloride, polyacrylic acid, polyester or polycarbonate. The plastic film is thin and only a single sheet of plastic is described on each side of the glass. The sheet is removed when the sheet becomes soiled.

U.S. Pat. No. 5,592,698 discloses a tear away lens stack for maintaining visibility through a transparent protective eye and face shield of a racing vehicle drivers helmet which includes a tab portion having projections formed thereon to assist in grasping the tab portion for rapid tear away. No adhesive is used in the stack; rather the lenses are clipped together.

A need thus exists for an article and a method for protecting windows, displays, and signage which is time and labor saving as well as cost effective.

SUMMARY OF THE INVENTION

The present invention provides fast, cost effective methods of restoring the optical clarity (i.e. decreasing the maximum haze and visible scatches) of a first substrate such as a window or glazing, for example. Also provided are the restored substrates. The article of the invention comprises a first substrate which has been scratched and/or abraded. On top of the first substrate is a first bonding layer and a second substrate. The second substrate is typically a pre-made plastic or glass material that forms a protective surface and a rejuvinated surface to the damaged first substrate. The first bonding layer typically flows into the damaged areas of the first substrate eliminating light diffussion due to the damaged areas of the glass.

We have discovered an article and a method for protecting repaired window substrates, displays, and signage which is time and labor saving as well as cost effective. The second substrate of a repaired first substrate is a stack of sheets that provides renewable protective layers to the first substrate. In another embodiment the stack of sheets can be applied to the second substrate.

The present invention provides fast, cost effective methods of restoring the optical clarity (i.e. decreasing the maximum haze and visible scratches) of a first substrate such as a window or glazing, for example. Also provided are the restored substrates. The article of the invention comprises a first substrate which has been scratched and/or abraded. On top of the first substrate is a first bonding layer and a second substrate. The second substrate is typically a pre-made stack of sheets comprising of plastic or glass material that forms a protective surface and a rejuvenated surface to the damaged first substrate. The first bonding layer typically flows into damaged areas of the first substrate eliminating light diffusion due to the damaged areas of the glass.

The stack of sheets are designed to be removable from each other such that a fresh sheet can be exposed after a topmost sheet above is damaged and then removed. The stack can be applied, for example, to the interior of bus or train windows to provide protection for the windows. As a sheet is damaged by graffiti artists, the topmost sheet of the article can be removed by trained maintenance personnel to reveal a clean undamaged sheet below. Preferably the time for each sheet removal is very fast (less than about 5 minutes, more preferably less than about 3 minutes and most preferably less than about 1 minute.) In addition, the articles of the invention are preferably cost effective. Using a preferred embodiment of the invention the speed of damage removal and low cost of damage removal allows the public transportation authorities to practice the "zero tolerance" scratchiti prevention system on the windows of public transportation vehicles.

The article of the invention can optionally be applied to backlit signage or highway/street signage that is in areas that make it susceptible to damage by graffiti artists, weathering, or normal wear and tear. It can, for example, preferably be used on top of the typical plastic layer protecting a sign or in place of it.

The present invention provides a laminate comprising:
(a) a first substrate, the first substrate having a first major surface and an opposite second major surface, wherein the first substrate comprises a material selected from the group consisting of glass, plastic and combinations thereof, wherein the first substrate has at least one scratch on its first major surface and wherein the first major surface of the first substrate has an $R_{max}$ of greater than about 1 micron;
(b) a second substrate having a first major surface and an opposite second major surface wherein the second substrate comprises immediately before, during and after formation of the laminate a material selected from the group consisting of glass, amorphous plastic in its glassy state, amorphous plastic in its rubbery state, crystalline plastic in its glassy state, crystalline plastic in its rubbery state, and combinations thereof;

(c) a first bonding material layer positioned between the first substrate and the second substrate in a manner to form a laminate, wherein the bonding material layer at least partially fills the scratch(es) and is in contact with at least the abraded area of the first major surface of the first substrate and is in contact with at least a portion of the second major surface of the second substrate;

(d) a stack of removable sheets bonded to the first major surface of the second substrate and/or the second surface of the first substrate;

wherein a maximum haze value through the laminate is less than about 20 percent.

Each sheet of the stack of sheets independently comprises:

(a) a film, the film having a first side having a surface area and an opposite second side having a surface area;

(b) a second bonding layer having a first side having a surface area and an opposite second side having a surface area, wherein the second bonding layer is bonded via its first side to the second side of the film such that at least a center of the surface area of the second side of the film is in contact with the second bonding layer, wherein at least about 50 percent of the surface area of the second side of the film has the second bonding layer bonded thereto;

(c) an optional release layer coated on the first side of the film;

wherein each sheet is stacked upon another sheet such that except for a bottom sheet of the stack of sheets, the second bonding layer of a sheet is in contact with the protective film or release layer, if present, of a sheet below;

wherein a topmost sheet can be removed from the stack of sheets by pulling it away from the stack such that the sheet being removed from the stack as well as the sheets remaining with the stack do not delaminate;

In another embodiment the invention provides a laminate comprising:

(a) a first substrate, the first substrate having a first major surface and an opposite second major surface, wherein the first substrate comprises a material selected from the group consisting of glass, plastic and combinations thereof, wherein the first substrate has at least one scratch on its first major surface and wherein the first major surface of the first substrate has an $R_{max}$ of greater than about 1 micron;

(b) a second substrate having a first major surface and an opposite second major surface wherein the second substrate comprises a stack of removable sheets;

(c) a first bonding material layer positioned between the first substrate and the second substrate in a manner to form a laminate, wherein the bonding material layer at least partially fills the scratch(es) and is in contact with at least the abraded area of the first major surface of the first substrate and is in contact with at least a portion of the second major surface of the second substrate;

wherein a maximum haze value through the laminate is less than about 20 percent.

Each sheet of the stack of sheets independently comprises:

(a) a film, the film having a first side having a surface area and an opposite second side having a surface area;

(b) a second bonding layer having a first side having a surface area and an opposite second side having a surface area, wherein the second bonding layer is bonded via its first side to the second side of the film such that at least a center of the surface area of the second side of the film is in contact with the second bonding layer;

wherein at least about 50 percent of the surface area of the second side of the film has the second bonding layer bonded thereto;

wherein a bottom sheet of the stack of sheets does not have the second bonding layer bonded to the second side of the film;

(c) an optional release layer coated on the first side of the film;

wherein each sheet is stacked upon another sheet such that except for a bottom sheet of the stack of sheets, the second bonding layer of a sheet is in contact with the protective film or release layer, if present, of a sheet below;

wherein a topmost sheet can be removed from the stack of sheets by pulling it away from the stack such that the sheet being removed from the stack as well as the sheets remaining with the stack do not delaminate;

Preferably the maximum haze value through the laminate is less than about 10 percent, more preferably less than about 5 percent, and most preferably less than about 3 percent.

The present invention also provides articles wherein the first substrate is scratched and/or abraded on both sides and the first bonding material and a second substrate are applied to both sides of the scratched first substrate. The final article preferably has the same haze value and scratch test values discussed elsewhere herein;

The first substrate and second substrate are typically permanently bonded to each other although the second substrate may optionally be readily removable exposing a first bonding layer surface.

In a preferred embodiment of the article of the invention the article when subjected to a visual acuity test using a 3 meter Snellen eye chart can allow an observer with 6 meter/6 meter vision to read the line on the eye chart which is indicative of about 6 meter/6 meter vision or better.

In a preferred embodiment the first side of the film is not bonded to a second bonding layer of the same sheet. In other words, preferably each sheet has a second bonding layer coated on the second side of the film only.

In a preferred embodiment of the article of the invention the second bonding layer is continuous.

In a preferred embodiment, the article of the invention when subjected to a 180° Peel Adhesion to Glass test leaves substantially no residue (more preferably no residue) on the glass.

One embodiment comprises an article wherein the first substrate has an abraded and/or scratched area on its first major surface and wherein the first major surface of the first substrate has a maximum haze value of about 20 or greater;

A preferred embodiment comprises an article wherein the first substrate has a Scratch Visibility rating 1–2 and the laminate has a Scratch Visibility rating of 0–1.

In a preferred embodiment of the article of the invention the stack of sheets is transparent.

In a preferred embodiment of the article of the invention each sheet has a penetration resistance of at least about 0.5 kg, even more preferably at least about 1 kg, even more preferably at least about 2 kg, even more preferably at least about 2.5, even more preferably at least about 3 kg, even more preferably at least about 3.5 kg, and most preferably about 4 kg.

With respect to the article of the invention preferably the maximum haze value of the stack of sheets is less than about 10 percent, more preferably less than about 5 percent, and most preferably less than about 3 percent.

In a preferred embodiment of the article of the invention at least about 80 percent (more preferably at least about 90 percent, and most preferably about 100 percent) of the surface area of the second side of the film has the second bonding layer bonded thereto.

In a preferred embodiment of the article of the invention the second bonding layer is continuous and any areas of the second side of the film not bonded to the second bonding layer are margin(s).

Preferably the article of the invention comprises at least about 3 sheets, more preferably about 5 to about 10 sheets.

In a preferred embodiment of the article of the invention the release layer is present and the release layer of each sheet has a Taber abrasion resistance of about 25 percent or less, more preferably about 10 or less, and most preferably about 2 or less according to ASTM D1044-76 after 100 cycles.

In a preferred embodiment of the article of the invention the second bonding layer comprises a material selected from the group consisting of acrylics, rubbers, polyolefins, silicones and mixtures thereof.

In a preferred embodiment of the article of the invention the second bonding layer comprises a pressure sensitive adhesive.

In a preferred embodiment of the article of the invention the second bonding layer has a thickness ranging from about 5 to about 150 microns, more preferably about 10 to about 25 microns.

In a preferred embodiment of the article of the invention the film has a thickness ranging from about 25 to about 4000 microns, more preferably about 50 to about 1000 microns.

In a preferred embodiment of the article of the invention the film comprises a material selected from the group consisting of polyester, polycarbonate, acrylic, polyurethanes, poly acetyl, polyolefin based ionomers, ethylene vinyl acetate polymers, polyethylene, polypropylene, polyvinyl chloride, polystyrene, urethane acrylate polymers, epoxy polymers, epoxy acrylate polymers, and blends thereof.

In a preferred embodiment of the article of the invention the film further comprises of an additive selected from the group consisting of ultraviolet lights absorbers, ultraviolet light stabilizers, flame retardants, smoke suppressants, antioxidants, and mixtures thereof.

In a preferred embodiment of the article of the invention the film comprises multiple layers.

In a preferred embodiment of the article of the invention each sheet has a tensile strength of about 20 to about 2000 kP, an elongation of about 5 to about 1000% and a tear strength of about 0.05 to about 5 kg. Even more preferably each sheet has a tensile strength of about 70 to about 1400 kP, an elongation of about 5 to about 500% and a tear strength of about 0.5 to about 2.5 kg. Most preferably each sheet has a tensile strength of about 350 to about 1000 kP, an elongation of about 20 to about 100% and a tear strength of about 1.5 to about 2.5 kg.

In a preferred embodiment of the article of the invention the release layer is present.

In a preferred embodiment of the article of the invention the release layer has a thickness ranging from about 0.1 to about 25 microns, more preferably about 2.5 to about 5 microns.

In a preferred embodiment of the article of the invention the release layer comprises a material selected from the group consisting of acrylates, methacrylates, urethanes, silicones, polyolefins, fluorocarbons and mixtures thereof.

In a preferred embodiment of the article of the invention the second bonding layer of each sheet further comprises a component selected from the group consisting of flame retardants, smoke suppressants, antioxidants ultraviolet light absorbers, ultraviolet light stabilizers, and mixtures thereof.

In a preferred embodiment of the article of the invention the topmost sheet is capable of being removed by gripping the sheet with an adhesive wand and pulling the sheet away from the stack of sheets of sheets.

In a preferred embodiment of the article of the invention the article further comprises a plurality of tabs, wherein a separate tab is bonded to a portion of the second side of the second bonding layer of each of the sheets in a manner such that the tab on the topmost sheet can be used to pull the topmost sheet away from the stack of sheets.

In a preferred embodiment of the article of the invention for each sheet at least a portion of a margin of the film does not have a second bonding material bonded thereto in a similar location such that the topmost sheet can be removed by grasping the portion of the barrier film without a second bonding material bonded thereto and pulling it away from the stack. Most preferably for each sheet the portion of the margin which does not have second bonding material bonded thereto is a corner of the sheet.

In a preferred embodiment of the article of the invention for each sheet at least a portion of a margin of the second bonding material is detackified in a similar location wherein the topmost sheet can be removed by grasping the sheet where the second bonding material is detackified and pulling it away from the stack. Most preferably for each sheet the portion of the margin where the bonding material is detackified is a corner of the sheet.

In a preferred embodiment of the article of the invention each sheet has a hole which extends through that sheet in a margin of the sheet, wherein the holes in the sheets are staggered such that the holes do not overlap and wherein the topmost sheet can be removed from the stack of sheets by using a tool which can be inserted in the hole of the topmost sheet and used to pull the topmost sheet away from the stack.

The present invention provides a construction comprising:

(i) an article comprising:

a laminate comprising:

(a) a first substrate, the first substrate having a first major surface and an opposite second major surface, wherein the first substrate comprises a material selected from the group consisting of glass, plastic and combinations thereof, wherein the first substrate has at least one scratch on its first major surface and wherein the first major surface of the first substrate has an $R_{max}$ of greater than about 1 micron;

(b) a second substrate having a first major surface and an opposite second major surface wherein the second substrate comprises immediately before, during and after formation of the laminate a material selected from the group consisting of glass, amorphous plastic in its glassy state, amorphous plastic in its rubbery state, crystalline plastic in its glassy state, crystalline plastic in its rubbery state, and combinations thereof;

(c) a first bonding material layer positioned between the first substrate and the second substrate in a manner to form a laminate, wherein the bonding material layer at least partially fills the scratch(es) and is in contact with at least the abraded area of the first major surface of the first substrate and is in contact with at least a portion of the second major surface of the second substrate;

(d) a stack of removable sheets bonded to the first major surface of the second substrate and/or the second surface of the first substrate;

wherein a maximum haze value through the laminate is less than about 20 percent. Each sheet of the stack of sheets independently comprises:

(a) a film, the film having a first side having a surface area and an opposite second side having a surface area;

(b) a second bonding layer having a first side having a surface area and an opposite second side having a surface area, wherein the second bonding layer is bonded via its first side to the second side of the film such that at least a center of the surface area of the second side of the film is in contact with the second bonding layer, wherein at least about 50 percent of the surface area of the second side of the film has the second bonding layer bonded thereto;

(c) an optional release layer coated on the first side of the film;

wherein each sheet is stacked upon another sheet such that except for a bottom sheet of the stack of sheets, the second bonding layer of a sheet is in contact with the protective film or release layer, if present, of a sheet below;

wherein a topmost sheet can be removed from the stack of sheets by pulling it away from the stack such that the sheet being removed from the stack as well as the sheets remaining with the stack do not delaminate;

The present invention also provides a construction comprising:

An article comprising:

a laminate comprising:

(a) a first substrate, the first substrate having a first major surface and an opposite second major surface, wherein the first substrate comprises a material selected from the group consisting of glass, plastic and combinations thereof, wherein the first substrate has at least one scratch on its first major surface and wherein the first major surface of the first substrate has an $R_{max}$ of greater than about 1 micron;

(b) a second substrate having a first major surface and an opposite second major surface wherein the second substrate comprises a stack of removable sheets;

(c) a first bonding material layer positioned between the first substrate and the second substrate in a manner to form a laminate, wherein the bonding material layer at least partially fills the scratch(es) and is in contact with at least the abraded area of the first major surface of the first substrate and is in contact with at least a portion of the second major surface of the second substrate;

wherein a maximum haze value through the laminate is less than about 20 percent.

Each sheet of the stack of sheets independently comprises:

(a) a film, the film having a first side having a surface area and an opposite second side having a surface area;

(b) a second bonding layer having a first side having a surface area and an opposite second side having a surface area, wherein the second bonding layer is bonded via its first side to the second side of the film such that at least a center of the surface area of the second side of the film is in contact with the second bonding layer;

wherein at least about 50 percent of the surface area of the second side of the film has the second bonding layer bonded thereto;

wherein a bottom sheet of the stack of sheets does not have the second bonding layer bonded to the second side of the film;

(c) an optional release layer coated on the first side of the film;

wherein each sheet is stacked upon another sheet such that except for a bottom sheet of the stack of sheets, the second bonding layer of a sheet is in contact with the protective film or release layer, if present, of a sheet below;

wherein a topmost sheet can be removed from the stack of sheets by pulling it away from the stack such that the sheet being removed from the stack as well as the sheets remaining with the stack do not delaminate;

wherein the stack of sheets when subjected to a visual acuity test using a 3 meter Snellen eye chart can allow an observer with 6 meter/6 meter vision to read a line on the eye chart which is indicative of about 6 meter/12 meter vision or better; and In a preferred embodiment of the article of the invention the substrate comprises a material selected from the group consisting of glass, metal, plastic, painted surfaces, wood, fabric, wallpaper, ceramic, concrete, mirrored surfaces, plastic/glass laminates, and combinations thereof.

In a preferred embodiment of the article of the invention the substrate is part of a structure. Most preferably the structure is selected from the group consisting of windows, walls, partitions, signs, bill boards, artwork, buildings, elevators, vehicles, furniture, and doors.

In a preferred embodiment the structure comprises a repaired window;

and wherein the construction further comprises a frame which is attached to a least a portion of the window such that it extends over at least one edge of the article. Preferably the frame extends over all the edge(s) of the article.

In another preferred embodiment the structure comprises a repaired window;

wherein the article further comprises a plurality of tabs, wherein a separate tab is bonded to a portion of the second side of the second bonding layer of each of the sheets in a manner such that the tab on the topmost sheet can be used to pull the topmost sheet away from the stack of sheets;

wherein the article is bonded via the first bonding layer of the bottom sheet to the window, wherein the article has at least one edge;

and wherein the structure further comprises a frame which is attached to at least a portion of the window such that it extends over at least one edge of the article in a manner which covers the tabs.

In another preferred embodiment of the construction the structure is a window;

wherein for each sheet at least a portion of a margin of the film does not have the second bonding material bonded thereto in a similar location such that the topmost sheet can be removed by grasping the portion of the barrier film without second bonding material bonded thereto and pulling it away from the stack;

wherein the article is bonded via the first bonding layer of the bottom sheet to the window, wherein the article has at least one edge;

and wherein the construction further comprises a frame which is attached to at least a portion of the window such that it extends over at least one edge of the article in a manner such that it extends over the portion of the film margin that does not have the second bonding material bonded thereto.

In another preferred embodiment of the construction structure comprises a window;

wherein for each sheet of the article at least a portion of a margin of the second bonding material is detackified in a similar location wherein the topmost sheet can be removed by grasping the sheet where the second bonding material is detackified and pulling it away from the stack;

wherein the article is bonded via the first bonding layer of the bottom sheet to the window, wherein the article has at least one edge; and wherein the construction further comprises a frame which is attached to at least a portion of the window such that it extends over at least one edge of the article such that it extends at least over the portion of the sheet margin wherein the second bonding material is detackified.

In another preferred embodiment of the construction the structure comprises a window;

wherein each sheet of the article has a hole which extends through that sheet in a margin of the sheet, wherein the holes in the sheets are staggered such that the holes do not overlap and wherein the topmost sheet can be removed from the stack of sheets by using a tool which can be inserted in the hole of the topmost sheet and used to pull the topmost sheet away from the stack;

wherein the article is bonded via the second bonding layer of the bottom sheet to the window, wherein the article has at least one edge; and wherein the construction further comprises a frame which is attached to at least a portion of the window such that it extends over at least one edge of the article such that it extends at least over the holes in the sheets.

In another preferred embodiment of the construction the structure comprises a vehicle comprising a window; and wherein the article is bonded via the second bonding layer of the bottom sheet to the window. Most preferably the vehicle is selected from the group consisting of buses, trains, and subways.

The invention provides a method comprising of the steps of:

(a) providing a first substrate, the first substrate having a first major surface and an opposite second major surface, wherein the first substrate is selected from the group consisting of glass, plastic and combinations thereof, wherein the first substrate has at least one scratch on its first major surface and wherein the first major surface of the first substrate has an $R_{max}$;

(b) abrading the first major surface of the first substrate over at least one scratch to provide an abraded area of the first major surface of the first substrate such that the first major surface of the first substrate has an $R_{max}$ which is less than that of step (a), wherein if the abrasion itself does not remove any visible contaminants on the first major surface of the first substrate, the first major surface of the first substrate is cleaned to remove any visible contaminants;

(c) forming a laminate comprising (i) the first substrate, (ii) a second substrate having a first major surface and an opposite second major surface, wherein the second substrate comprises immediately before, during and after the formation of the laminate a material selected from the group consisting of glass, amorphous plastic in its glassy state, amorphous plastic in its rubbery state, crystalline plastic in its glassy state, crystalline plastic in its rubbery state and combinations thereof, (iii) a first bonding material layer, wherein the bonding material layer is positioned between the first substrate layer and the second substrate layer, wherein the first bonding material layer is in contact with at least the abraded area of the first major surface of the first substrate and is in contact with at least a portion of the second major surface of the second substrate; and (iv) a stack of removable sheets bonded to the first major surface of the second substrate and/or the second surface of the first substrate;

wherein a maximum haze value through the laminate is less than about 20 percent.

(d) allowing a topmost sheet of the stack of removable sheets to be damaged;

(e) removing the damaged topmost sheet of the article by gripping the sheet and pulling it away from the stack, in a manner such that neither the sheet being removed nor the stack of sheets which remains delaminates, in order to expose a lower sheet of the article which thence becomes the topmost sheet of the article.

Each sheet independently comprises:

(I) a film, the film having a first side having a surface area and an opposite second side having a surface area;

(II) a second bonding layer having a first side having a surface area and an opposite second side having a surface area, wherein the second bonding layer is bonded via its first side to the second side of the film such that at least a center of the surface area of the second side of the film is in contact with the second bonding layer, wherein at least about 50 percent of the surface area of the second side of the film has the second bonding layer bonded thereto, wherein with respect to each sheet the first side of the film is not bonded to a second bonding layer of the same sheet;

(III) an optional release layer coated on the first side of the film;

wherein each sheet is stacked upon another sheet such that except for a bottom sheet of the stack of sheets, the second bonding layer of a sheet is in contact with the protective film or release layer, if present, of a sheet below;

wherein a topmost sheet can be removed from the stack of sheets by pulling it away from the stack such that the sheet being removed from the stack as well as the sheets remaining with the stack do not delaminate;

wherein the stack of sheets when subjected to a visual acuity test using a 3 meter Snellen eye chart can allow an observer with 6 meter/6 meter vision to read a line on the eye chart which is indicative of about 6 meter/12 meter vision or better.

to a substrate via the bonding layer of the bottom sheet of the article;

Another embodiment includes a method comprising the steps of:

(a) providing a first substrate, the first substrate having a first major surface and an opposite second major surface, wherein the first substrate is selected from the group consisting of glass, plastic and combinations thereof, wherein the first substrate has at least one scratch on its first major surface and wherein the first major surface of the first substrate has an $R_{max}$;

(b) abrading the first major surface of the first substrate over at least one scratch to provide an abraded area of the first major surface of the first substrate such that the first major surface of the first substrate has an $R_{max}$ which is less than that of step (a), wherein if the abrasion itself does not remove any visible contaminants on the first major surface of the first substrate, the first major surface of the first substrate is cleaned to remove any visible contaminants;

(c) forming a laminate comprising (i) the first substrate, (ii) a second substrate having a first major surface and an opposite second major surface, and (iii) a first bonding material layer, wherein the bonding material layer is positioned between the first substrate layer and the second substrate layer, wherein the first bonding material layer is in contact with at least the abraded area of the first major surface of the first substrate and is in contact with at least a portion of the second major surface of the second substrate;

and wherein the second substrate comprises a stack of removable sheets;

(d) allowing a topmost sheet of the stack of removable sheets to be damaged;

(e) removing the damaged topmost sheet of the article by gripping the sheet and pulling it away from the stack, in a manner such that neither the sheet being removed nor the stack of sheets which remains delaminates, in order to expose a lower sheet of the article which thence becomes the topmost sheet of the article.

wherein a maximum haze value through the laminate is less than about 20 percent.

Each sheet independently comprises:

(i) a film, the film having a first side having a surface area and an opposite second side having a surface area;

(ii) a second bonding layer having a first side having a surface area and an opposite second side having a surface area, wherein the second bonding layer is bonded via its first side to the second side of the film such that at least a center of the surface area of the second side of the film is in contact with the second bonding layer;

wherein at least about 50 percent of the surface area of the second side of the film has the second bonding layer bonded thereto, wherein with respect to each sheet the first side of the film is not bonded to a second bonding layer of the same sheet;

wherein a bottom sheet of the stack of sheets does not have the second bonding layer bonded to the second side of the film;

(iii) an optional release layer coated on the first side of the film;

wherein each sheet is stacked upon another sheet such that except for a bottom sheet of the stack of sheets, the second bonding layer of a sheet is in contact with the protective film or release layer, if present, of a sheet below;

wherein a topmost sheet can be removed from the stack of sheets by pulling it away from the stack such that the sheet being removed from the stack as well as the sheets remaining with the stack do not delaminate;

wherein the stack of sheets when subjected to a visual acuity test using a 3 meter Snellen eye chart can allow an observer with 6 meter/6 meter vision to read a line on the eye chart which is indicative of about 6 meter/12 meter vision or better.

In a preferred embodiment of the method, steps (b) and (c) are repeated at least once. More preferably steps (b) and (c) are repeated until the bottom sheet is removed, and the bottom sheet upon removal leaves substantially no adhesive residue (most preferably) on the substrate.

In a preferred embodiment of the method at least a portion of the first bonding material layer which is brought into contact with the abraded area of the first substrate upon forming the laminate has a stress relaxation value of about 15 to about 100 percent when measured at a temperature at which the laminate is formed.

In a more preferred embodiment of the method at least a portion of the first bonding material layer which is brought into contact with the abraded area of the first substrate upon forming the laminate has a stress relaxation value of about 20 to about 90 percent when measured at a temperature at which the laminate is formed.

In one embodiment of the invention the first substrate is rigid and the second substrate is rigid.

In one embodiment of the invention the first substrate is rigid and the second substrate is flexible.

In another embodiment of the article of the invention the first bonding material is selected from the group consisting of viscous liquids, viscoelastic solids, and mixtures thereof.

In another embodiment of the article of the invention the first bonding material is selected from the group consisting of polyacrylics, polyolefins (polyoctenes, polyhexene), rubber, polymers, silicones and mixtures thereof.

In a preferred embodiment of a method of the invention the maximum haze value through the laminate is less than about 10 percent, more preferably less than about 5 percent, and most preferably less than about 3 percent.

In one embodiment of a method of the invention step (c) comprises the steps of (i) providing a layer of first bonding material over the abraded area of the first substrate wherein the first bonding material having a stress relaxation value of at least about 15% at a temperature at which the laminate is formed; and (ii) placing the second substrate over the coating in order to form a laminate.

In one embodiment of a method of the invention step (c) comprises the steps of (I) providing a construction comprising
    (i) the second substrate;
    (ii) the layer of first bonding material having a stress relaxation value of at least about 15% at a temperature at which the laminate is formed coated on said second substrate;

(II) laminating together the construction and the first substrate in a manner such that the first bonding material layer having a stress relaxation value of at least about 15 % is in contact with at least the abraded area of the first major surface of the first substrate.

In another embodiment of a method of the invention step (c) comprises the steps of (I) providing a construction comprising
    (i) the second substrate; and
    (ii) the first bonding material layer having a stress relaxation value of less than about 15% at a temperature at which the laminate is formed coated on at least a portion of the second major surface of said second substrate;

(II) causing the first bonding material layer of (I) (ii) to change such that its stress relaxation value becomes at least about 15% at a temperature at which the laminate is formed;

(III) laminating together the construction and the first substrate in a manner such that the first bonding material layer having a stress relaxation value of at least about 15% is in contact with at least the abraded area of the first surface of the first major surface.

In one embodiment of a method of the invention the $R_{max}$ of the first major surface of the first substrate in step (a) is at least about 40 microns.

In one embodiment of a method of the invention the $R_{max}$ of the first major surface of the first substrate in step (b) is about 25 microns or less.

In one embodiment of a method of the invention the $R_{max}$ of the first major surface of the first substrate in step (a) is at least about 40 microns to about 500 microns.

In one embodiment of a method of the invention the $R_{max}$ of the first major surface of the first substrate in step (b) is about 15 microns or less.

In one embodiment of a method of the invention the $R_{max}$ of the first major surface of the first substrate in step (a) is at least about 40 microns to about 100 microns.

In one embodiment of a method of the invention the $R_{max}$ of the first major surface of the first substrate in step (b) is about 8 microns or less.

In one embodiment of a method of the invention the maximum haze value of the first major surface of the first substrate in step (b) is at least about 30% and the maximum haze value through the laminate in step (c) is less than about 20%.

In one embodiment of a method of the invention the first substrate is a glass window.

In one embodiment of a method of the invention the first substrate and the second substrate have the same shape, width and length.

The present invention also provides a method comprising:
(a) providing a first substrate, the first substrate having a first major surface and an opposite second major surface, wherein the first substrate is selected from the group consisting of a stack of sheets; glass, plastic and combinations thereof, wherein the first substrate has at least one scratch on its first major surface and wherein the first major surface of the first substrate has an $R_{max}$ greater than about 1 micron;
(b) removing any visible contaminants on the first major surface of the first substrate by cleaning;
(c) forming a laminate comprising (i) the first substrate, (ii) a second substrate having a first major surface and an opposite second major surface, wherein the second substrate comprises immediately before, during and after formation of the laminate a material selected from the group consisting of a stack of sheets; glass, amorphous plastic in its glassy state, amorphous plastic in its rubbery state, crystalline plastic in its glassy state, crystalline plastic in its rubbery state and combinations thereof, and (iii) a first bonding material layer positioned between the first substrate layer and the second substrate layer, wherein the first bonding material layer is in contact with at least the abraded area of the first major surface of the first substrate and is in contact with at least a portion of the second major surface of the second substrate layer; (iv) a stack or removable sheets bonded to the first major surface of the second substrate and/or to the second major surface of the first substrate; wherein a maximum haze value through the laminate is less than about 20 percent and wherein the maximum haze value through the laminate is less than the maximum haze value of the first substrate.

In a preferred embodiment of the article of the invention the first substrate has a Scratch Visibility Test Rating of 1–2 and the laminate has a Scratch Visibility Test Rating of 0–1.

In a preferred embodiment of the article of the invention the first substrate has a maximum haze value of about 20 or greater and the maximum haze value through the laminate article is less than about 20 percent.

In a preferred embodiment of a method of the invention the first substrate has after an abrading step a maximum haze value of about 20 or greater and the maximum haze value through the laminate article is less than about 20 percent.

In a preferred embodiment the article when subjected to a visual acuity test using a 3 meter Snellen eye chart can allow an observer with 6 meter/6 meter vision to read a line on the eye chart which is indicative of about 6 meter/9 meter vision or better.

In a preferred embodiment the first bonding material layer completely fills the scratch(es) in the first substrate.

In a preferred embodiment the maximum haze value through the laminate is less than about 10 percent, more preferably less than about 5 percent, and most preferably less than about 3 percent.

BRIEF DESCRIPTION OF THE DRAWINGS

FIG. 4 is a perspective view of a second substrate 216 coated with the first bonding layer 218.

FIG. 5 is a perspective view another embodiment of the coated film 220.

FIG. 6 illustrates a plan view of the same window of FIG. 3 wherein a coated film 214 is being moved into position for placement onto the window 200.

FIG. 7 illustrates a plan view of the window of FIG. 6 wherein the coated film 214 has been positioned into place thus rendering the window 200 clear enough so that the tree 204 can be viewed therethrough.

DETAILED DESCRIPTION OF THE INVENTION

First Substrate

Figures 1, 2:
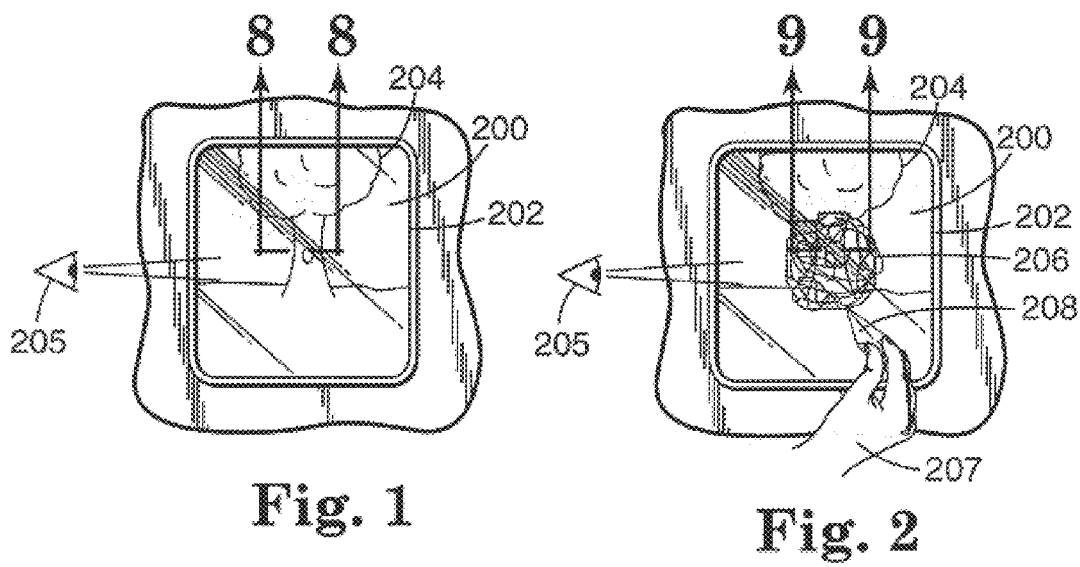
FIG. 1 illustrates a plan view of a window 200.
FIG. 2 illustrates a plan view of the same window 200 as in FIG. 1 except that it shows a vandal 207 scratching the window 200 with a rock 208.

The first substrate should be relatively clean before application of the first bonding layer and the second substrate. If it is not relatively clean, visible debris could become trapped in the final article thus interfering with the haze or visibility of a repaired scratch. The first substrate can be cleaned for example with soap and water and a brush. This may be sufficient to remove any debris, particularly debris which may be stripped in scratches. However, since debris which may be trapped in the scratches can be difficult to remove, abrasion may be necessary by itself or in addition to cleaning.

The first substrate comprises glass, plastic or combination thereof that has been damaged by scratching and/or abrading with, for example, a rock or other abrasive articles such as sandpaper, abrasive cloth, diamond earrings or tungsten-carbide tipped styli. The first substrate, except for the damaged areas, is typically transparent. The first substrate can optionally be tinted and/or contain printed images. The first substrate could, for example, be safety glass where two pieces of the glass are laminated to a polyvinyl butyral film such that the film is between the two sheets of glass. The first substrate could optionally be thermally tempered glass where the glass has been heated and rapidly cooled. The result is a stratified glass morphology where the outer surfaces of the glass are hardened by the tempering process and the center portion of the glass is under compression. Thermally tempered glass, when cut or damaged through the outer tempered layer will shatter into many pieces because the compressed inner layer is no longer under compression in the damaged area. To relieve the stress, the glass shatters. The first substrate could optionally be chemically tempered glass where to 2–10 microns of each side of the glass are hardened by a chemical process. In the case of chemically tempered glass the center layer is not under compression. If the hardened outer layer is damaged, chemically tempered glass will not shatter like thermally tempered glass. The first substrate can alternatively comprise plastics such as, for example, polycarbonate or polymethylmethacrylate based polymers.

Typically it is easier to scratch plastic than glass. Thus the scratches in damaged glass are typically not as deep as those in damaged plastic.

The scratched and/or abraded surface of the first substrate is characterized by two measurements. The first measurement is $R_{max}$, where $R_{max}$ is the maximum peak to valley height of the scratched and/or abraded surface of the first substrate. The measurement describes the depth of the scratches and/or abrasions on the surface.

The second measurement used to characterize the surface is $R_a$. $R_a$ is an indication of the variability of the surface roughness and is defined as the arithmetic mean of the departures at the roughness profile from the mean line of the surface profile. Both surface measurements are familiar to those skilled in the art and are commonly used to characterize a surface. The units of measure for $R_a$ and $R_{max}$ are typically in microns. Mathematically the terms are described as follows.

$$R_{max} = y_{max} - y_{min} \text{ wherein}$$

$y_{max}$ = the highest vertical point over the profilometer assessment length.

$y_{min}$ = the lowest vertical point over the profilometer assessment length.

$$R_a = \frac{1}{L} \int_O^L |y(x)| 2x \quad \text{where}$$

L=The assessment length of the profilometer. During the test the profilometer head moves over the sample and has a path of typically 5 mm in the x direction. This can be adjusted on most profilometers.

y=variation of the height and depth of the profile or the vertical component of the data.

x=horizontal component of the profilometer motion as traverses across the sample. L represents the maximum x value for the measurement process.

Typically the $R_{max}$ value of a scratched glass substrate such as a window pane ranges from about 1 to about 75 microns. For plastic substrates, the damaged substrates typically have an $R_{max}$ value ranging from about 1 to about 300 microns. The tool used to measure $R_{max}$ of the damaged first substrate was a profilometer manufactured by the Mahr Corporation of Cincinnati Ohio (Model: Perthometer M4P).

The method of repair and surface preparation of the first substrate required to provide a final laminate article having the desired haze value depends on the composition of the first substrate, the cleanliness of the first substrate including damaged areas and the depth or severity of the damage. In a less complex case where the damaged first substrate is clean and the severity of the scratches is minimal (i.e. the $R_{max}$ is less than about 50 microns) then no additional surface preparation is typically required. However, frequently the scratches contain debris and need to be aggressively cleaned such as with a scrubbing pad and a soap.

However, debris in some cases is most effectively removed from the damaged first substrate by an abrasion process. Several abrasive methods can be used to abrade the damaged surface of the first substrate including sand blasting, high pressure water with an abrasive grit, grinding with a flexible diamond or aluminum oxide abrasive material, etc. Care needs to taken when abrading the first substrate especially thermally tempered glass. If the outer layer is penetrated by the damage or by the abrasion process, the glass may shatter. For thermally tempered glass the depth of each of the outer tempered layers is typically 30% of the thickness of the glass. The thickness of the compression layer is typically 40% of the thickness of the glass.

The abrasion process also smoothes the topography of the scratches. The depth of the scratches is reduced and preferably the sharpness of the scratches is minimized. The preferred method for cleaning and reducing the depth of scratches is a robotic abrasion process that grinds the surface of the first substrate such as glass with a 74 to 250 micron 3M™ Flexible Diamond abrasive available from the 3M Company. With such a robotic system for example, a damaged window 50 cm×125 cm in size and scratched with scratches such that the $R_{max}$ of the window surface is 75 microns can be completely abraded in 8–15 minutes depending on the type of glass being abraded. The cleaning and/or abrading process of substrates comprising plastic are similar to glass substrates. In the simplest case where the scratch is clean and not severe (where $R_{max}$ is less than about 50 microns) then no surface preparation is required. The difference between surface preparation between a glass substrate and plastic substrate is typically in the type of abrasive used. Typically aluminum oxide abrasive materials are used on plastic substrates and the time required to abrade the substrate is typically less than for glass.

The damage of the first substrate in some situations may not be restricted to one surface of the substrate. It is possible for the fist substrate to be damaged on both the front and back surface. An example is a glass or plastic bus shelter where passengers wait for the arrival of the bus. It is common to observe scratching on both surfaces of the plastic or glass that comprise the bus shelter. In such a circumstance to provide the desired maximum haze or desired visibility of a repaired scratch to a final laminate article one would need to optionally clean and optionally abrade each first substrate surface, followed by applications of a bonding material and second substrate. The desired haze or visibility of a repaired scratch values, etc. of the repaired structure should be the same if only one surface was repaired.

Second Substrate

The second substrate comprises a stack of sheets; glass; an amorphous and/or crystalline plastic material in its rubbery and/or glassy state immediately prior, during and after lamination to the first substrate; or a combination thereof. Examples of useful second substrates include, for example, glass panes, pre-made plastic films and combinations thereof such as safety glass. The second substrate useful herein typically has substantially the same (preferably the same) breadth, length, and width immediately before, during, and after it is applied to the first substrate. For example, a gel or liquid would not be considered to have the same breadth, length, and width immediately before and after application to a substrate.

The purpose of the second substrate is to act as a support for the first bonding layer and to provide a new undamaged surface in place of the damaged first substrate. The second substrate provides protection in addition to enhancing the strength and shatter resistance of the first substrate. The second substrate is typically transparent which means that it does not typically detract from the observer's ability to distinguish images therethrough. The second substrate can optionally be tinted or contain printed images in a manner in which does not impact the observer's ability to distinguish or read images through at least a portion, preferably a major portion, and most preferably all of the second substrate. The second substrate is not applied as a gel or a flowable liquid but as glass and/or as an amorphous and/or crystalline plastic in its rubbery or glassy state (preferably glassy) immediately prior, during, and after application. The "solid" nature of the second substrate makes application of the second substrate much easier to the first substrate than would be the spraying or coating a liquid or a gel. The uniformity of the second substrate used herein (which is typically a pre-made plastic film or glass pane) is far superior to that which could be obtained by application of a liquid or gel which must later cure or set in place. Uniformity of the second substrate is helpful in providing a final laminate article with the desired optical properties (such as haze or visibility of a repaired scratch). Another advantage of having a second substrate that is not a liquid or gel is that the thickness of the second substrate can be accurately defined in advance of the application. The thickness can be important where the second substrate offers protection and enhances the safety of the first substrate.

Typically a second substrate which comprises a polymeric material has a tensile strength as measured according to ASTM D882 of about 20 to about 2000 kPa, preferably about 70 to about 1400 kPa, and most preferably about 350 to about 100 kPa.

Typically a second substrate which comprises a polymeric material has an elongation as measured according to ASTM D882 of about 5 to about 1000 percent, preferably about 5 to about 500 percent, and most preferably about 350 to about 1000 percent.

Typically a second substrate which comprises a polymeric material has a tear strength as measured according to ASTM D1004 of about 0.4 to about 40 N, preferably about 4 to about 20 N, and most preferably about 12 to about 20 N.

Typically a second substrate which comprises a polymeric material has a thickness of about 25 to about 4000 microns, preferably about 50 to about 1000 microns, and most preferably about 50 to about 250 microns.

For a non-polymeric second substrate such as glass, for example, the thickness typically ranges from about 1 mm to about 10 mm, preferably about 2 mm to about 7 mm.

Depending on the application, the second substrate may need to resist a wide variety of environmental conditions including prolonged exposure to high temperatures, high humidity or ultraviolet light. The second substrate may, for example, comprise a polymer including but not limited to those selected from the following broad classifications of materials: polyesters, polycarbonates, acrylics, polymethacrylates, polyurethanes, urethane acrylate polymers, epoxy acrylate polymers, polyacetals, polystyrene, polyvinyl chloride, and polyolefins such as ethylene vinyl acetate copolymers, polyethylene, polypropylene, ionomers of ethylene, and mixtures thereof. The second substrate may comprise, for example, a blend of the materials listed above or multilayer structures of the materials listed.

The second substrate may optionally further comprise additives such as, for example, flame retardants, ultraviolet light absorbers, antioxidants, and hindered amine stabilizers, and combinations thereof. The second substrate may optionally further comprise an abrasion resistant coating on the surface that is not in contact with the first bonding layer. Multifunctional acrylate or methacrylate abrasion resistant coatings are described in U.S. Pat. No. 5,633,049, issued on May 27, 1997. The second substrate may optionally be primed to enhance the adhesion of the first bonding layer thereto. The primes may include, for example, surface treatments such as corona treatments or flame treatments or may include, for example, coatings such as acrylics, polyvinyl chloride, polyvinyl chloride/polyvinyl acetate copolymers, polyesters, urethanes, polyamides, and chlorinated olefins or maleic anhydride modified olefins.

First Bonding Material Between the First and Second Substrate

The first bonding material is preferably transparent and preferably flows into the scratches and/or abraded areas of the damaged first substrate which aids in preparation of the final article with the desired maximum haze value or visibility of repaired scratch value. As the haze is improved, the transparency of the article is improved. The first bonding material may, for example, be a solid, semi-solid or liquid. The first bonding material is preferably a poly(acrylate) or (methacrylate), polyolefin, silicones or rubber based pressure sensitive adhesive that has a stress relaxation value of about 15 percent or greater. Stress relaxation is a property that is indicative of the viscoelastic flow of the material. Stress relaxation is measured as described in the Test Methods. First bonding materials with little or no flow properties relax only 0 to less than about 15% of the applied stress. First bonding materials which are useful in this invention preferably have the viscoelastic flow properties needed for flowing into the abraded and/or scratched surface of the first substrate. They preferably stress relax from greater than about 15 to 100% of the applied stress. Stress relaxation values are temperature sensitive. The value for stress relaxation are values obtained when stress relaxation is measured at about 23° and about 50% relative humidity.

The thickness of the first bonding material is important, as the $R_{max}$ of the scratches increases, the first bonding layer thickness preferably increases so enough mass of the first bonding layer is available to flow into the damaged areas of the first substrate. The thickness of the coated first bonding layer also depends on the amount of flow exhibited by the first bonding layer. A first bonding layer made of a flowable viscous liquid preferably should be coated at a thickness less than the deepest scratch while first bonding layers made of polymers that have less viscoelastic flow preferably should be coated at a thickness greater than the scratch requiring repair.

The refractive index of the first bonding layer may be important when repairing deep scratches. To minimize the visibility of a repaired scratch, matching the index of refraction (i.e. typically within about 0.05, more preferably exactly the same) of the first bonding layer to the index of refraction on the first substrate is preferred especially if the $R_{max}$ of the first substrate is greater than 50 microns. The closer the match in refractive index, typically the less visible the repaired scratch. On first substrates where the $R_{max}$ is less than 25 microns, the matching the refractive index of the first substrate with the first bonding layer is less important.

The first bonding material can optionally further comprise one or more additives including but not limited to those selected from the group consisting of flame retardants, ultraviolet light absorbers, antioxidants, and hindered amine stabilizers. The first bonding layer is preferably laminated to a release liner to protect the first bonding layer surface from handling damage or dirt pick up.

To facilitate application of a first bonding material coated second substrate to the abraded and/or scratched first substrate a water/alcohol or water/detergent mixture may be used, for example. An example thereof is a 25 percent by weight isopropanol water solution. Such a mixture is typically applied with a spray bottle to the scratched and/or abraded substrate. The release liner protecting the first bonding layer of the first bonding material coated substrate is removed and the first bonding material is also sprayed with such a mixture. The wet first bonding material layer surface and the wet first substrate surface are brought into contact. The excess solution is removed from the interface with a squeegee or a roller such that no trapped air or excess solution is left at the interface of the first substrate and the first bonding material. A solution of 0.1% to 1% by weight liquid detergent in water based on the total weight of the detergent/water solution is also useful as an aid for application.

The first bonding layer can alternatively be applied by first forming a laminate comprising the second substrate, the first bonding layer coated on one surface thereof, and a non-tacky coating coated over the first bonding layer. The first bonding layer may, for example, comprise a pressure-sensitive adhesive. For example, a pressure sensitive adhesive may be applied to one side of the second substrate, coated with a thin non-tacky coating and dried. This non-tacky surface prevents the first bonding layer inadvertently adhering to a surface prior to use. This non-tacky surface upon subsequent conversion to a tacky surface would later be positioned against the first substrate.

The non-tacky coating allows large sections of the second substrate to be more easily applied to a first substrate in environments (such as a bus, for example) where there is an abundance of debris such as dust and dirt, without as much concern for the debris collecting on the tacky first bonding material.

An example of a useful non-tacky material for this purpose is a water-soluble cellulose based non-tacky material such as Methocel™ A15-LV methocellulose from Dow Chemical of Midland, Mich. Such a material is typically coated such that the dry thickness is about 1 to about 5 microns. Water is typically used to convert the non-tacky coating to a tacky coating although a water/detergent and/or a water/alcohol solution may also be used. Such a spray is typically also used on the first substrate to facilitate application of the second substrate and first bonding layer. For example, water may be sprayed on the cellulose based surface coating and on the first substrate prior to lamination of the cellulosic surface to the first substrate surface. The trapped water is removed from the first substrate/water soluble coating interface using a squeegee or roller. The thin soluble coating is dissolved during the process exposing the pressure sensitive adhesive to the first substrate. In this case the pressure sensitive adhesive layer has a high degree of viscoelastic flow and the cellulose based coating in the water saturated state has a high degree of viscoelastic flow. When the water evaporates the cellulose based coating and the pressure sensitive adhesive typically have filled the voids in the scratched and/or abraded first substrate and the remaining cellulose based layer becomes rigid. The pressure sensitive adhesive bonds to the first substrate in regions where the cellulose based coating has been completely dissolved.

The first bonding material may optionally be in the state of a viscous liquid. The viscous liquid is preferably 100% solids so no solvent evaporation is required. The viscous liquid is preferably transparent. The viscous liquid typically comprises acrylate monomers such as those selected from the group consisting of acrylates, methacrylates, urethane acrylates or epoxy acrylates, and a photoinitiator(s) required to activate polymerization by radiation such as UV or visible light. The viscous liquid can be coated onto the second substrate and laminated to the first substrate using a squeegee and roller to eliminate any trapped air at the interface. The viscous liquid could also be applied directly to the damaged first substrate. The second substrate is applied to the first substrate coated with the viscous liquid. Any trapped air is removed with a squeegee or a roller. The viscous solution is subsequently cured. This embodiment is very useful at repairing severely damaged first substrates with deep scratches and where repair time is a critical factor.

Release Liner

Preferably a release liner protects the surface of the first bonding layer not in contact with the second substrate. Preferably the release liner imparts no texture to the first bonding layer, shields the first bonding layer from contamination from debris, and is easily released from the first bonding layer prior to application. Useful release liners include, for example, polyester or polyolefin films. These films may be coated with silicone or fluorinated release surfaces to facilitate release from the first bonding layer. For added dimensional stability, the release liner may comprise a film and paper laminate provided the paper imparts no texture or a texture that does not detract from the transparency of the first bonding layer.

Stack of Sheets

The second substrate can be preferably a stack of sheets that has no effect on visual acuity. The test for the effect on visual acuity appears later herein. This test can be used to determine the effect of an observer to discern images when looking through the article of the invention.

In another embodiment the stack of sheets is applied to the second substrate.

Preferably the laminate (as well as the stack of sheets and each individual sheet) has a haze value of less than about 10 percent, more preferably less than about 5 percent, and most preferably less than about 3 percent.

The article of the invention as well as the sheets making up the article are typically colorless although they may optionally be tinted. The sheets may optionally have a graphic thereon which would typically be on the edge of each sheet.

Sheets

Preferably the article comprises at least about 3 sheets, typically about 5 to about 10 sheets. Preferably each sheet has the same length, width, and shape. In a preferred embodiment each sheet is rectangular in shape.

Each sheet preferably provides a protective barrier to preferably prevent damage to a substrate to be protected such as a glass window as well as any sheets below the exposed topmost sheet. The sheet preferably resists penetration and damage from conventional scratching tools such as razor blades, knives, lava rocks, abrasive cloths, diamonds and carbide tipped styli. Preferably at least one (more preferably each) sheet has a penetration resistance of at least about 0.5 kg, more preferably at least about 2 kg, and most preferably at least about 4 kg.

Effect on visual acuity and color preferably remain stable upon exposure to a variety of environmental conditions.

The sheet is preferably easily removable, preferably in a continuous piece. The following tests which evaluate the integrity and removability of a sheet can be used to help predict the removability of a sheet.

Preferably at least one sheet (more preferably each sheet as well as each film making up the sheet) has a tensile strength when subjected to ASTM D882 of about 20 to about 2000 kP, more preferably about 70 to about 1400 kP, and most preferably about 350 to about 1000 kP. Preferably at least one sheet (more preferably each sheet as well as each film making up each) has an elongation when subjected to ASTM D882 of about 5 to about 1000%, preferably about 5 to about 500 percent, and most preferably about 20 to about 100 percent.

Preferably at least one sheet (preferably each sheet as well as each film making up each sheet) has a tear strength when subjected to ASTM D1004 of about 0.05 to about 5 kg, more preferably about 0.5 to about 2.5 kg, and most preferably about 1.5 to about 2.5 kg.

Film

Preferably the film comprises a material selected from the group consisting of polyester, polycarbonate, acrylic, polyurethanes, poly acetyl, polyolefin based ionomers, ethylene vinyl acetate polymers, polyethylene, polypropylene, polyvinyl chloride, polystyrene, urethane acrylate polymers, epoxy polymers, epoxy acrylate polymers, and blends thereof. In one embodiment the film comprises multiple layers.

The thickness of the film depends on the type of damage that the film may be subjected to and the composition of the film. Typically the film has a thickness of about 25 to about 4000 microns for reasons of weight, visual acuity and economics, preferably about 50 to about 1000 microns and most preferably about 50 to about 250 microns.

The film can optionally further comprise stabilizers and fillers which enhance the durability of the film upon exposure to ultraviolet light and/or heat. Additives can also be incorporated into the film that reduce the flammability of the film or smoke generation during combustion.

Second Bonding Layer

The second bonding layer preferably provides a stable bond between the film layers. It is intended to prevent premature separation of the sheets under the environmental conditions anticipated in the application. It preferably serves to act as an optically clear interface between the films. However, it must bond more readily to the film of the same sheet than to the film of the sheet below.

In a preferred embodiment the first side of the film is not bonded to a second bonding layer. The second bonding layer as well as the other layers making up a sheet preferably do not change color when subjected to environmental conditions. Furthermore, the stability of the second bonding layer preferably should not change dramatically on exposure to a wide range of conditions.

The second bonding layer may comprise a pressure sensitive adhesive system or a non-pressure sensitive adhesive system. Preferably the bonding layer comprises a pressure sensitive adhesive. The second bonding layer preferably comprises a material selected from the group consisting of acrylics, for example, which are thermally cured, ultraviolet light cured, electron beam cured and can be solvent based, waterbased or 100 percent solids; rubbers, for example, which can be thermoplastic rubbers, block copolymers, natural rubbers or silicone rubbers; and polyolefins which can, for example, be ethylene vinyl acetate polymers, poly-alpha olefins ($C_3$–$C_{10}$) copolymers or blends of poly-alpha olefins with ethylene or propylene based polymers; and mixtures thereof.

The second bonding layer may optionally further comprise a component selected from the group consisting of tackifiers, oils, stabilizers, flame retardants fillers, and mixtures thereof subject to obtain the desired properties. Preferably the second bonding layer further comprises a component selected from the group consisting of ultraviolet light absorbers, ultraviolet light stabilizers and mixtures thereof. Preferably the component selected from the group consisting of ultraviolet light absorbers, ultraviolet light stabilizers and mixtures thereof is used in an amount to inhibit degradation of the article from ultraviolet radiation, preferably about 0.5 to about 1 percent by weight based on the total weight of the second bonding layer.

Preferably at least about 80 percent, more preferably at least about 90 percent, and most preferably about 100 percent of the surface area of the second side of the film has the second bonding layer bonded thereto. Preferably the second bonding layer is continuous. Preferably any areas of the film not covered by the second bonding layer are margin(s).

Preferably the second bonding layer has a thickness ranging from about 5 to about 150 microns, more preferably about 10 to about 50 microns, and most preferably about 10 to about 25 microns.

Optional Release Layer

The optional release layer preferably prevents light scratching of the surface of the film and in addition can provide a release surface for the second bonding layer on the sheet above. This optional release layer is preferably bonded to the film layer in a manner so as to maintain the bond after a variety of environmental exposures. In addition, the release layer preferably remains clear after environmental exposures. It preferably maintains scratch resistant over time. It preferably forms a stable adhesion to the second bonding layer and provides a consistent surface for removal of the sheet above.

Preferably the release layer, if present has a thickness ranging from about 0.1 to about 25 microns, more preferably about 2.5 to about 5 microns.

Preferably the release layer comprises a material selected from the group consisting of acrylates, methacrylates, urethanes, polyolefins, silicones, fluorochemicals such as fluorocarbons, and mixtures thereof.

U.S. Pat. No. 5,633,049 describes a method of making a protective coating for thermoplastic transparencies particularly aircraft transparencies. The coating is prepared from a silica-free protective coating precursor composition comprising a multifinctional ethylenically unsaturated ester of acrylic acid, a multifunctional ethylenically unsaturated ester of methacrylic acid, or a combination thereof; and an acrylamide. Such a protective coating may be useful as a release coating for the article of the present invention.

The release layer may optionally further comprise a filler such as ceramar particles, for example, as described in U.S. Pat. No. 5,104,929, in order to provide enhanced abrasion resistance properties.

The adhesion of the second bonding layer to the release layer can be adjusted, for example, by incorporation of flow additives such as silicones, acrylics or fluorochemicals to the release layer.

The release layer can optionally be selected to improve the Taber Abrasion Resistance of the sheet. Release materials which may provide good Taber Abrasion Resistance properties include but are not limited to multifunctional acrylates or methacrylates.

The release layer on the top surface of the film layer may provide uniform release performance across the sheet. Optionally, a differential release layer can be coated on the film surface. Such a differential release layer can be used to make the initial separation of a sheet from the stack of sheets easier. Differential release can be obtained, for example, by coating a material providing easy release at the edge and/or corner of the sheet and coating a material providing tighter release on the balance of the sheet surface.

Suitable multifunctional ethylenically unsaturated esters of (meth)acrylic acid are the polyacrylic acid or polymethacrylic acid esters of polyhydric alcohols including, for example, the diacrylic acid and dimethylacrylic acid ester of aliphatic diols such as ethyleneglycol, triethyleneglycol, 2,2-dimethyl-3,3-propanediol, 1,3-cyclopentanediol, 1-ethoxy-2,3-propanediol, 2-methyl-2,4-pentanediol, 1,4-cyclohexanediol, 1,6-hexamethylenediol, 1,2-cyclohexanediol, 1,6-cyclohexanedimethanol; the triacrylic acid and trimethacrylic acid esters of aliphatic triols such as glycerin, 1,2,3-propanetrimethanol, 1,2,4-butanetriol, 1,2,5-pentanetriol, 1,3,6-hexanetriol, and 1,5,10-decanetriol; the triacrylic acid and trimethacrylic acid esters of tris (hydroxyethyl) isocyanurate; the tetraacrylic and tetramethacrylic acid esters of aliphatic triols, such as 1,2,3, 4-butanetetrol, 1,1,2,2,-tetramethylolethane, 1,1,3,3-tetramethylolpropane, and pentaerythritol tetraacrylate; the pentaacrylic acid and pentamethacrylic acid esters of aliphatic pentols such as adonitol; the hexaacrylic acid and hexamethacrylic acid esters of hexols.

Preferably the release layer is present and the release layer of at least one sheet (preferably each sheet) has a Taber abrasion resistance of about 25 or less (more preferably about 10 or less and most preferably about 2 or less) as measured according to ASTM D1044-76 after 100 cycles. The release layer is not required if the second bonding layer is anchored well to the film. For example, the film surface coated with the second bonding layer may be chemically primed or oxidized with a corona discharge treatment or flame treatment. The film surface not coated with the second bonding layer would be free of surface treatments. This adhesion differential between the two sides of the film facilitates clean separation of sheets from the stack. The film may also be soluble in the solvents or monomers used for the second bonding layer. By coating a second bonding layer on a soluble film and curing or evaporating, the second bonding layer can become entangled with the film. The adhesion of the second bonding layer to the coated film surface is greater than adhesion to the laminated surface in the stack of sheets. due to the differential in adhesion, clean separation of a sheet from a stack can be obtained.

Optional Prime Layer

An optional prime layer can be used to provide an adhesion promoting interface between the second bonding layer and the film of the same sheet. Alternatively the film surface can optionally be modified via corona discharge treatments in a variety of atmospheres or by using a flame in order to promote adhesion between the second bonding layer and the film of the same sheet. A prime layer can be, for example, an aziridine based prime layer or a grafted surface such as an acrylamide/multifunctional acrylate polymerized into the film surface with high-energy radiation. Other examples of prime layers include, for example, acrylics, polyvinylidene chloride and solution coated polyesters.

A prime layer can be, for example, a high tack pressure sensitive adhesive with a composition similar to the second bonding layer. It can also, for example, be a coextruded interface prepared as a component of the film or resin solution coated on the film.

Preparation of the Stack of Sheets

The stack of sheets used as the second substrate can be made in a number of different ways. One method of making the article of the invention is to apply the optional release coating on the surface of a film. The release coating could be applied by roll coating, gravure coating, or by an air knife coating process, for example. Any solvent(s) present in the coating are evaporated in an oven. The release coating can then be cured with ultraviolet (UV) light or with an electron beam. Alternatively, the opposite surface of the film may optionally be primed either with a surface treatment such as corona treatment or a flame treatment. The prime could also be a chemical prime. The chemical prime could be pre-applied by the film supplier or applied, for example, by roll coating, gravure coating, or by an air knife coating process. The solvent(s) are evaporated from the priming layer. The prime layer may be coated with the second bonding layer by a variety of methods including notch bar coating, curtain coating, or slot die coating of a solution or latex. Another method of applying the second bonding layer is extrusion coating of a 100% solids second bonding layer. Depending on the chemistry of the coating, the second bonding layer material is dried and/or cured to form a finished polymer. When the second bonding layer is tacky at room temperature the second bonding layer is preferably protected by a smooth release film. A stack of sheets can be prepared by removing the release liner from the second bonding layer and laminating the second bonding layer to the release surface of an adjacent sheet. The end application dictates the number of sheets in the stack. The stack of sheets can be cut into a desired shape by die cutting with a steel rule die, laser or with a water jet.

Another approach to forming a stack of sheets is to prepare a film with a primed surface and an opposite release surface. An ultraviolet curable liquid second bonding layer is applied to the primed surface of one film and laminated in the liquid state to the release surface of a subsequent film. The liquid is cured. An ultraviolet curable liquid second bonding layer is applied to the primed surface of a third film and laminated to the exposed release surface of the first laminated sheets. The liquid is cured resulting in a stack of three sheets. This lamination and curing process can be repeated until the desired number of sheets in a stack is obtained.

Other approaches to making the article of the invention are also possible.

Application of the First Bonding Layer and Second Substrate (Stack of Sheets) to the First Substrate The first bonding layer and second substrate (stack of sheets) can be applied to a first substrate in a number of different ways. For example, it can be applied by spraying an alcohol/water solution such as a 25% isopropanol/75% water solution on to the surface of the first substrate. The release liner is removed from the second substrate such as the bottom sheet of the stack of sheets to expose a first bonding layer. The exposed first bonding layer is also sprayed with the same isopropanol/water solution. The first substrate and the saturated first bonding layer are brought into contact and the excess solution is removed from the interface with a roller or a squeegee. The second substrate (stack of sheets) and the saturated first bonding layer could also be applied to a first substrate with a dilute solution of dishwashing detergent in water such as for example a 0.5% Joy™ dishwashing detergent 99.5% water solution. The second substrate (stack of sheets) with the first bonding layer could also be applied directly to the first substrate with high pressure lamination without a liquid interface. The second substrate (stack of sheets) could be applied to the first substrate by applying an ultraviolet light curable first bonding layer on the first substrate as the liquid interface. The second substrate (stack of sheets) is applied to the first bonding layer on the first substrate the excess air is removed by a roller or squeegee and the coating is cured.

Removal of Sheets from the Stack of Sheets

In one embodiment of the article of the invention the topmost sheet is capable of being removed by gripping the sheet with an adhesive wand and pulling the sheet away from the stack of sheets.

In another embodiment the article further comprises a plurality of tabs, wherein a separate tab is bonded to the second side of the second bonding layer of each of the sheets in a manner such that the tab on the topmost sheet can be used to pull the topmost sheet away from the stack of sheets.

In another embodiment of the article for each sheet at least a portion of a margin of the film does not have bonding material bonded thereto in a similar location such that the topmost sheet can be removed by grasping the portion of the barrier film without bonding material bonded thereto and pulling it away from the stack. Preferably for each sheet the portion of the margin which does not have bonding material bonded thereto is a corner of the sheet.

In another embodiment of the article for each sheet at least a portion of a margin of the bonding material is detackified in a similar location wherein the topmost sheet can be removed by grasping the sheet where the bonding material is detackified and pulling it away from the stack. Preferably for each sheet the portion of the margin where the bonding material is detackfied is a corner of the sheet.

In another embodiment of the article each sheet has a hole which extends through that sheet in a margin of the sheet (preferably the same margin), wherein the holes in the sheets are staggered such that the holes do not overlap and wherein the topmost sheet can be removed from the stack of sheets by using a tool (such as a pick) which can be inserted in the hole of the topmost sheet and used to pull the topmost sheet away from the stack.

Test Methods

Penetration Resistance

A white painted steel panel from Advanced Coating Technologies in Hillsdale Mich. is used as a base. A 50 mm×150 mm test sample is secured to the painted surface of the steel panel using a 100 mm×50 mm piece of No. 232 Scotch™ Masking Tape from 3M Company along the long edges of the sample such that a 125 mm×50 mm portion of the sample is in direct contact with the painted panel. (In the case of a sheet or stack of sheets the exposed adhesive layer is placed in contact with the painted panel.) The panel with the sample on the top surface is placed onto an electronic balance with a capacity of 20 kg. The balance is tared to the combined weight of the panel and sample. Using a stainless steel coated industrial single edge razor blade, apply a force of 0.5 kg to the test sample and hold for 2 seconds. Remove the blade from the test sample and repeat identically the force application and removal at a site 0.5 cm away from the original test site. Repeat the force application and removal at a site 0.5 cm away from the second site and at least 0.5 cm away from the first site to thus obtain 3 replicates at this force level. Color each force application test area with a black Sharpie™ felt tipped permanent marker from the Sanford Corp. The ink will flow through a penetrated area of the test sample and produce a mark on the white metal panel. Remove the test sample from the base panel and observe any marks on the base panel. If no marks are present the sample has passed the test. If any marks are present the sample has failed the test. Repeat the test using the following forces in the test: 1 kg, 1.5 kg, 2 kg, 2.5 kg, 3 kg, 3.5 kg, and 4 kg. The force required to penetrate the sample is recorded.

Effect of Sample on Visual Acuity of Observer

An observer with 6 meter/6 meter vision is positioned 3 meters from a 3 Meter Snellen eye chart, covers one eye and read with the uncovered eye the line which corresponds to 6 meter/6 meter vision. The observer will be considered to have 6 meter/6 meter vision if the observer has that vision unaided or has that vision with corrective lenses as long as the corrective lenses are worn during the testing. A 75 mm×75 mm sample of the article or material to be evaluated is then placed 3 centimeters in front of the observer's uncovered eye while the other eye remains covered to determine if the sample causes a loss of visual acuity. If the sample has a protective release liner, the release liner is removed prior to conducting the test. If the viewer can still read the line of letters indicative of 6 meter/6 meter vision it is considered that there is no interference with visual acuity caused by the sample. If the line indicative of 6 meter/6 meter vision cannot still be read the smallest line which can still be read is recorded, (For example 6 meter/9 meter, 6 meter/12 meter, 6 meter/15 meter, 6 meter/18 meter, etc.).

Preferably with respect to an article of the invention the answer can read a line indicative of 6 meter/18 meter vision or better, preferably 6 meter/5 meter vision or better, more preferably 6 meter/12 meter vision or better, even more preferably 6 meter/6 meter or better, and most preferably 6 meter/6 meter or better.

Appearance After 120 Hours at 23° C. and 180 Degree Peel Adhesion Between a Second Bonding Layer of a Sheet and the Surface of an Adjacent Supported Film A supported film is prepared as follows. A 105 mm×305 mm piece of 467 VHB™ Transfer Adhesive from 3M Company is removed from a roll. The transfer adhesive is an acrylic adhesive coated on a paper liner where both surfaces of the paper liner were treated with a differential silicone release such that the adhesive releases from one side of the liner easier than the other side. The sheet of transfer adhesive was laminated with a rubber roller to the entire surface of a 100 mm×300 mm rectangular painted white metal panel from Advanced Coatings Technology of Hillsdale, Mich. The release liner is removed from the transfer tape exposing the adhesive on the entire surface of the metal panel. To the adhesive is applied a 110 mm×320 mm film in such a way that film/adhesive/panel laminate is free of bubbles. The film is applied to the panel such that the release surface (the release layer or the surface of the first side of the film if there is no release layer present) is on the opposite surface of the film from the adhesive coated panel. Any excess film and adhesive was trimmed away.

To this panel supported film is laminated a 25 mm×150 mm sample of the sheet to be tested. (The sheet to be tested typically comprises a film with a second bonding layer coated on one surface thereof.) The sample sheet is bonded to the panel supported film via its second bonding layer. A rubber roller is used and in such a way that 100 mm of the sheet is bonded onto the panel supported film and 50 mm of the sheet hangs freely over the edge of the panel supported film. This assembly is allowed to dwell for 120 hours at room temperature and about 50% relative humidity (R.H.).

The over-hanging edge of the sample sheet is clamped to a sensor of a Slip-Peel Tester Model SP-102C-3090 adhesion tester (IMASS Inc. Accord, Mass.). The rest of the assembly is firmly clamped onto a carriage of the Slip-Peel Tester. As the carriage moves upon operation of the tester the sheet sample is peeled from the panel supported film at a rate of 228.6 cm/min and at an angle of 180 degrees. The average force required to remove the sheet sample from the panel-supported film over a 2-second test period is recorded. The test was conducted at about 23° C. and about 50% relative humidity.

Typical 180 degree peel adhesion values for a sheet of the article of the invention range from about 50 to about 2000 g/2.54 cm. The 180 degree peel adhesion values at the lower end of the range facilitate easy stripping of one sheet from another sheet. The 180 degree peel adhesion values at the upper end of the range make stripping of the sheets more challenging but the integrity of the stack (the ability of the stack to resist premature separation) can be maintained better when vandals scratch the surface of the stack. The preferred 180 degree peel adhesion range is about 500 to about 1500 g/2.54 cm. The most preferred 180 degree peel adhesion range is about 750 to about 1250 g/2.54 cm.

Appearance After Heat Aging and 180 Degree Peel Adhesion Between a Second Bonding Layer of a Sheet and the Surface of an Adjacent Supported Film The 180 degree peel adhesion force between a second bonding layer on a sheet sample and the surface of an adjacent supported film is evaluated as described in the test method entitled "180 Degree Peel Adhesion Between a Second bonding layer of a Sheet and the Surface of an Adjacent Supported Film" except the assembly is aged for 5 days at 80° C. The assembly is examined for discoloration, blistering, and adhesive residue. Preferably the test sample is not discolored or blistered. The test sample is allowed to equilibrate to room temperature for 2 hours prior to testing. The test was conducted at about 23° C. and 50% relative humidity.

The 180 degree peel adhesion value of a sheet of the article of the invention should preferably be stable compared to the room temperature adhesion value measured according to the test entitled "Appearance After 120 hours at 23° C. and 180 Degree Peel Adhesion Between a Second Bonding Layer of a Sheet and the Surface of an Adjacent Supported Film". The 180 degree peel adhesion after heat aging preferably should not increase more than about 50% and should not decrease more than about 25%. The test sample preferably leaves no residue such as adhesive residue upon removal.

Appearance After Continuous Exposure to Condensing Humidity and 180 Degree Peel Adhesion Between a Second Bonding Layer of a Sheet and the Surface of an Adjacent Supported Film The adhesion force between a second bonding layer of a sheet and the surface of an adjacent supported film is evaluated as described in the test method entitled "Appearance After 120 hours at 23° C. and 180 Degree Peel Adhesion Between a Second Bonding Layer of a Sheet and the Surface of an Adjacent Supported Film" except that the assembly is first continuously aged in a chamber that is maintained at 38° C. and 100% relative humidity for 5 days prior to appearance evaluation and 180 degree peel adhesion testing. The assembly is examined for discoloration and blistering. The assembly is allowed to equilibrate to room temperature for 2 hours prior to testing for 180 degree peel adhesion. The test was conducted at about 23° C. and 50% relative humidity.

The 180 degree peel adhesion value of a sheet of the article of the invention should preferably be stable compared to the room temperature 180 degree peel adhesion value as measured according to the test method entitled "Appearance After 120 hours at 23° C. and 180 Degree Peel Adhesion Between a Second Bonding Layer of a Sheet and the Surface of an Adjacent Supported Film". The level of 180 degree peel adhesion after condensing humidity exposure preferably should not increase more than about 50% or decrease more than about 25%. The test sample preferably leaves no residue such as adhesive residue upon removal.

Appearance After an Environmental Cycling Test and 180 Degree Peel Adhesion Between a Second Bonding Layer on a Sheet Sample and the Surface of a Supported Adjacent Film The adhesion force between a second bonding layer on a sheet sample and the surface of a supported adjacent film is evaluated as described in the test method entitled "Appearance After 120 hours at 23° C. and 180 Degree Peel Adhesion Between a Second Bonding Layer of a Sheet and the Surface of an Adjacent Supported Film" except that prior to testing the assembly is first aged in a controlled environmental chamber that is programmed to conduct the following continuous cycle: 4 hours at 40° C./100% relative humidity (RH), followed by 4 hours at 80° C. and then followed by 16 hours at −40° C. The sample is exposed 10 times to this cycle. The sample is examined for discoloration and blistering. Preferably the aged sample does not experience discoloration or blistering. The sample is allowed to equilibrate to room temperature for 2 hours before 180 degree peel adhesion testing. The peel adhesion test was conducted at about 23° C. and about 50% humidity.

The 180 degree peel adhesion value of a sheet of the article of the invention should preferably be stable compared to the room temperature adhesion value as evaluated in the test method entitled "Appearance After 120 hours at 23° C. and 180 Degree Peel Adhesion Between a Second Bonding Layer of a Sheet and the Surface of an Adjacent Supported Film". The level of 180 degree peel adhesion of a sheet of the article of the invention after thermal cycling preferably should not increase more than about 50% or decrease more than about 25%. The test sample preferably leaves no residue such as adhesive residue on removal.

180 Degree Peel Adhesion to Glass of the Second Bonding Layer

A 100 mm×200 mm flat glass plate is cleaned with toluene and allowed to air dry prior to application of a sheet sample to be tested. (The sheet to be tested typically comprises a film and a second bonding layer bonded to one side thereof.) The adhesion to glass is measured by bonding a 25 mm×150 mm of the sheet sample to be tested using a rubber roller such that no trapped air and 25 mm×50 mm of the sheet is hanging over the edge of the glass. The sheet is applied such that the second bonding layer of the sheet is in contact with the glass. The sheet is allowed to dwell on the glass at least 10 minutes but less than 60 minutes. The glass plate is clamped onto the carriage of a Slip-Peel Tester Model SP-102C-3090 adhesion tester (IMASS Inc., Accord Mass.). The overhang of the sheet is clamped to a sensor of the tester. As the carriage moves upon operation of the tester the force to peel the sheet is measured at 228.6 cm/min at an angle of 180 degrees. The average force over a 2 second period is recorded. The test is conducted at about 23° C. and about 50% R.H.

Typically the 180 degree peel adhesion to glass of a sheet of an article of the invention is about 100 g/2.54 cm to about 5000 g/2.54 cm, preferably about 500 g/2.54 cm to about 3000 g/2.54 cm, and most preferably about 1500 g/2.54 cm to about 2500 g/2.54 cm. One hundred eighty degree peel adhesion above about 5000 g/2.54 cm is less preferred, because the sheet may be difficult to remove after a prolonged time on the glass. One hundred eighty degree peel adhesion below about 100 g/2.54 cm is less preferred, because the bond to the glass could potentially be disrupted when the individual sheets are removed from the stack.

The glass panel is inspected for residue left after the sheet sample is peeled from the glass. Preferably substantially no residue (such as adhesive residue) remains on the glass. Most preferably no visible residue (such as adhesive residue) remains on the glass. The percentage of the area of the test panel where the sample was initially applied on which any residue remained is recorded.

Haze Test

The haze of a sample is measured by using a Garner XL211 Hazeguard device. The procedure used is in accordance to ASTM D1003-95 with the following exceptions 1. The sample size is rectangular with a minimum size of 40 mm×40 mm.
2. The sample is scanned for areas of the maximum haze. These selected areas are measured and the maximum haze value is reported.
3. The sample is allowed equilibrate at 23° C. and 50% R.H. for 72 hours prior to testing.
4. If printed or embossed images or graphics are contained on the sample, those areas of the sample should be avoided when measuring the maximum haze of the sample.
5. Prior to conducting the haze test, the release liner (if any) is removed from the sample.

Scratch Resistance

A 1.2 kg hammer manufactured by Collins Axe Company is provided. A tungsten carbide tipped stylus from General Tools Manufacturing Co. Inc. New York, N.Y. is taped securely to the very top of the metal head of the hammer such that the tip of the nail points in substantially the same downward direction as does the hitting end of the hammer head. The nail is positioned such that it is substantially perpendicular to the handle of the hammer. The stylus protrudes from the hammer 2.5 cm. The tape used is No 471 tape from 3M Company. The sheet sample is attached to a 100 mm×300 mm white painted metal panel and held securely in place. The hammer is held at the end of the handle while the carbide stylus bears the weight of the hammer. A straight edge is taped to the sheet sample as a guide. The hammer is pulled down the length of the panel at about 200 cm/min such that the weight of the hammer is on the stylus. The hammer is pushed back up the length of the panel. Each up and down motion consisted of one cycle. The number of cycles needed to scratch through the sample and into the white paint is reported.

The scratch resistance of a sheet or a film layer of an article of the invention typically ranges from about 5 to more than about 500 cycles, preferably greater than about 10 cycles, more preferably greater than 50 cycles and most preferably greater than about 100 cycles.

Taber Abrasion Resistance

A 7.5 cm diameter non-abraded circular sample of the material to be tested is cut such that a 1.25 cm hole is provided in the center of the sample. The haze of the non-abraded sample is then measured using a Gardner XL211 Hazeguard system. The Gardner XL211 Hazeguard system is balanced and calibrated to zero using the non-abraded sample. The sample is clamped in a fixture of a Taber abrader. The sample is abraded using the Taber Abrader with CS10 wheels and a 500 gram load for 100 cycles. The haze of the abraded sample is measured using the Gardner XL211 Hazeguard system. The difference in haze of the abraded surface and the non-abraded surface is recorded.

The Taber abrasion resistance value is the percentage difference between the haze value of the abraded sample and the non-abraded sample. Preferably the Taber abrasion resistance of the sample of the material being tested after 100 cycles is less than about 25 percent, more preferably less than about 10 percent, and most preferably less than about 2 percent.

Test Methods for the First Bonding Layer and Sheets Used in the Stack of Sheets

Stress Relaxation of the First Bonding Layer

The sample preparation techniques for measuring stress relaxation is slightly different depending on the embodiment of the invention being evaluated. The specific procedures and test methods are outlined below for each embodiment. The percent stress relaxation in each case is calculated as follows (wherein the loads are in the same units). Typically the first bonding layer useful according to the present invention, regardless of the embodiment, exhibits a stress relaxation of greater than about 15 percent preferably greater than about 20 percent, and most preferably greater than about 25 percent.

Percent Stress Relaxation=(initial load−load after 120 sec)×100/initial load

Stress Relaxation Test Procedure Used when the First Bonding Layer is Inherently Tacky The first bonding material to be evaluated is coated on a non-extensible backing film (such as a polyester film with a minimum thickness of 100 microns, for example) to a dried thickness of at least 25.4 microns. A variety of coating methods may be used. The coating needs to be applied such that the surface of the coating is free from dirt and smooth. The coated film is cut into a 25 mm×150 mm strip.

A 50 mm×150 mm #6 stainless steel test panel is cleaned with toluene and dried. The coated film is applied via its coating side to the steel panel such that a 25 mm×25 mm area of the coated film is in contact with the panel and the remaining portion of the coated film hangs over the edge of the panel. Thumb pressure is used to apply the coated film to the panel. The interface between the coated film and the panel is free of trapped air bubbles and the coated film and the panel are in intimate contact. The panel with the coated film applied thereto is mounted in a tensile testing device (such as an Instron Model # 5565 from the Instron Corporation of Houston Tex.) in its bottom jaw while the overhang portion of the coated film is held in its upper jaw. A shear load of 4.5 kg (i.e. the initial load) is applied to the panel with the coated film applied thereto with a jaw speed of 2.54 cm/sec. The fraction of the remaining load on the sample after a 120-second time interval is recorded. The test is conducted at about 23° C. and about 50% Relative Humidity (R.H.) but could be conducted at other temperatures such as the use temperature or at the temperature range of 0–25 degrees C. if desired.

Stress Relaxation Procedure Used when the First Bonding Layer is Coated with a Water Soluble Detackifying Layer The test panel procedure begins by cleaning the 50 mm×150 mm #6 stainless steel panel with toluene and allowing the panel to dry. Apply approximately 5 g of water on the panel directly in the 25 mm×25 mm location of the coated film to be tested. Apply the coated film onto the wet test panel such that a 25 mm×25 mm area of the coated film is in contact with the test panel and the remaining portion of the coated film hangs over the edge of the panel. With a roller, squeegee or thumb pressure, remove the excess water from the interface. After 72 hours at about 23° C. and about 50% R.H., conduct the stress relaxation test. The panel with the coated film applied thereto is mounted in a tensile testing device (such as an Instron Model # 5565 from the Instron Corporation of Houston Tex.) in its bottom jaw while the overhang portion of the coated film is held in its upper jaw. A shear load of 4.5 kg (i.e. the initial load) is applied to the panel with the coated film applied thereto with a jaw speed of 2.54 cm/sec. The fraction of the remaining load on the sample after a 120-second time interval is recorded. The test was conducted at about 23° C. and about 50% R.H. but could be conducted at other temperatures such as the use temperature or at the temperature range of 0–25 degrees C. if desired.

Stress Relaxation Procedure Used when First Bonding Layer is Comprised of a Reactive Liquid The 50 mm×150 mm #6 stainless steel panel is cleaned with toluene and allowed to dry. The unreacted first bonding material is coated on a non-extensible backing preferably a transparent corona treated polyester film greater than 50 micron in thickness. The size of the coated sheet is 25 mm×150 mm. The coated film is applied to the panel with the coating of liquid first bonding layer in contact with the panel such that a 25 mm×25 mm area of coated film is in contact with the panel. The remaining portion of the strip hangs over the edge of the panel. The coating is cured. Curing may be accomplished with UV light or by a thermal process depending on the chemistry of the coating. The stress relaxation is measured when the coating is cured. The panel with the coated film applied thereto is mounted in a tensile testing device (such as an Instron Model # 5565 from the Instron Corporation of Houston Tex.) in its bottom jaw while the overhang portion of the coated film is held in its upper jaw. A shear load of 4.5 kg (i.e. the initial load) is applied to the panel with the coated film applied thereto with a jaw speed of 2.54 cm/sec. The fraction of the remaining load on the sample after a 120-second time interval is recorded. The test was conducted as about 23° C. and about 50% R.H. but could be conducted at other temperatures such as the use temperature or at the temperature range of 0–25 degrees C. if desired.

180 Degree Peel Adhesion to Glass-Procedure Used when the First Bonding Layer is Inherently Tacky A 100 mm×200 mm flat glass plate is cleaned with toluene and allowed to air dry prior to application of the material (a second substrate with a first bonding layer) to be tested. The adhesion to glass is measured by bonding a 25 mm×150 mm of the material to be tested using a rubber roller such that no trapped air exists at the glass first bonding layer interface and a 25 mm×50 mm of the material being tested is hanging over the edge of the glass plate. The material being tested is allowed to dwell on the glass at least 10 minutes. The glass plate is clamped onto the carriage of a Slip-Peel Tester Model SP102C-3090 adhesion tester (IMASS Inc., Accord Mass.). The overhang of the sheet is clamped to a sensor of the tester. As the carriage moves, the force to peel the sheet is measured at 228.6 cm/min at an angle of 180 degrees. The average force over a 2 second period is recorded. The test is conducted at about 23° C. and about 50% R.H.

The glass panel is inspected for residue (such as adhesive residue) left after peel. Preferably substantially no residue remains on the glass. Most preferably no residue remains on the glass.

180 Degree Peel Adhesion to Glass-Procedure Used when the First Bonding Layer is Coated With a Water-Soluble Detackifying Layer A 100 mm×200 mm flat glass plate is cleaned with toluene and allowed to air dry prior to application of the material (a second substrate/first bonding layer/water soluble detackifying layer laminate) to be tested. A 0.5% Joy™ dishwashing detergent 99.5% water solution is applied over the glass surface. The adhesion to glass is measured by bonding a 25 mm×150 mm of the material to be tested to the glass such that the detackifying layer is in contact with the detergent and water coated glass. A rubber roller is used such that no large bubbles of water are present under the material. A 25 mm×50 mm section of the material being tested hangs over the edge of the glass plate. The material being tested is allowed to dwell on the glass for 72 hours at about 23 degree C. and 50% R.H. The glass plate is clamped onto the carriage of a Slip-Peel Tester Model SP-102C-3090 adhesion tester (IMASS Inc., Accord Mass.). The overhang of the sheet is clamped to a sensor of the tester. As the carriage moves, the force to peel the sheet is measured at 228.6 cm/min at an angle of 180 degrees. The average force over a 2 second period is recorded. The test is conducted at about 23° C. and about 50% R.H.

The glass panel is inspected for residue (such as adhesive residue) left after peel. Preferably substantially no residue remains on the glass. Most preferably no residue remains on the glass.

180 Degree Peel Adhesion to Glass-Procedure Used when the First Bonding Layer is a Reactive Liquid A 100 mm×200 mm flat glass plate is cleaned with toluene and allowed to air dry prior to application of the material (a second substrate with a reactive liquid first bonding layer) to be tested. The adhesion to glass is measured by bonding a 25 mm×150 mm of the material to be tested such that the first bonding material is in contact with the glass using a rubber roller such that no air bubbles are present under the material and a 25 mm×50 mm section of the material being tested is hanging over the edge of the glass plate. The first bonding material is cured. The first bonding material can be accomplished with UV light or by a thermal process depending on the chemistry of the coating. The glass plate is clamped onto the carriage of a Slip-Peel Tester Model SP- 102C-3090 adhesion tester (IMASS Inc., Accord Mass.). The overhang of the sheet is clamped to a sensor of the tester. As the carriage moves, the force to peel the sheet is measured at 228.6 cm/min at an angle of 180 degrees. The average force over a 2 second period is recorded. The test is conducted at about 23° C. and about 50% R.H.

The glass panel is inspected for residue (such as adhesive residue) left after peel. Preferably substantially no adhesive residue remains on the glass. Most preferably no adhesive residue remains on the glass.

Scratch Visibility Test

The sample to be evaluated is placed at a 45° angle over a black substrate in a McBeth light booth (Model No. STLA available from the McBeth Corporation, Newborough, N.Y.) and viewed at a distance of 3 meters under daylight lamp settings by an observer with vision of 6 meter/6 meter or vision corrected to 6 meter/6 meter. The sample is rated for the visibility of scratch(es). The most visible scratch in sample is examined and used to rate the sample. A rating of 0 indicates that no scratch(es) are visible in the sample. A rating of 1 indicates the scratch(es) be seen with great difficulty. A rating of 2 indicates the scratch(es) in the sample can be seen without difficulty. This test can be performed for example on a singe scratched substrate or a laminate article such as the article of the invention. When one compares the article of the invention itself to the first scratched substrate one should preferably see a reduction in the test value of at least 1. A scratched first substrate typically has a rating of 1–2. An article of the invention preferably has a test value of 0–1 more preferably 0. To test a single layer of a preformed laminate such as the first substrate for scratches, one could take apart the laminate and clean the bonding material from the substrate to test the single scratched first substrate.

DETAILED DESCRIPTION OF THE DRAWINGS

The invention will be better understood by referring to the following FIGS. 1–26. The figures are meant to be illustrative and are not drawn to scale.

FIG. 1 illustrates a plan view of a window 200. A rim 202 extends around the window 200. An observer 205 views a tree 204 through the window 200.

FIG. 2 illustrates a plan view of the same window 200 as in FIG. 1 except that it shows a vandal 207 scratching the window 200 with a rock 208. The tree 204 can no longer be clearly viewed through the window 200.

Figure 3:
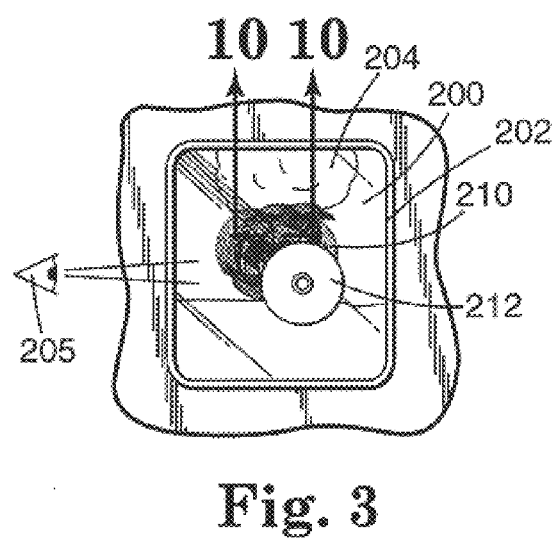
FIG. 3 illustrates a plan view of the same window 200 as in FIG. 2 except that the window 200 has been abraded with an abrasive disk 212 over the scratches.

FIG. 3 illustrates a plan view of the same window 200 as in FIG. 2 except that the window 200 has been abraded with an abrasive disk 212 over the scratches. Typically the abrasive disk 212 would be a part of a grinder held by an operator. Neither the grinder nor operator are shown, however. The abraded surface 210 is shown.

FIG. 4 is a perspective view of a second substrate 216 coated with the first bonding layer 218. The coated film 214 comprises a plastic film second substrate 216 and a first bonding layer 218.

FIG. 5 is a perspective view another embodiment of the coated film 220. The coated substrate comprises a glass sheet second substrate 222 and a first bonding layer 218.

FIG. 6 illustrates a plan view of the same window of FIG. 3 wherein a coated film 214 is being moved into position for placement onto the window 200.

FIG. 7 illustrates a plan view of the window of FIG. 6 wherein the coated film 214 has been positioned into place thus rendering the window 200 clear enough so that the tree 204 can be viewed therethrough.

Figure 8:
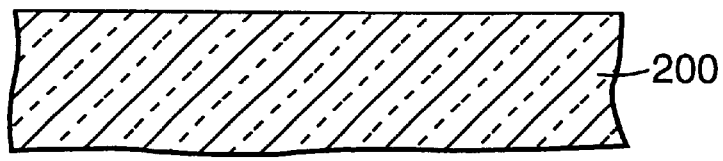
FIG. 8 is a cross-sectional view taken along line 8—8 on FIG. 1.

FIG. 8 is a cross-sectional view taken along line 8—8 on FIG. 1. FIG. 8 shows the window 200 before it is scratched.

Figure 9:
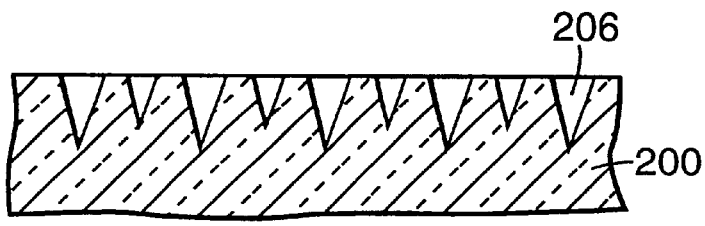
FIG. 9 is a cross-sectional view taken along line 9—9 on FIG. 2.

FIG. 9 is a cross-sectional view taken along line 9—9 on FIG. 2. FIG. 9 shows the window 200 with scratches 206 therein.

Figure 10:
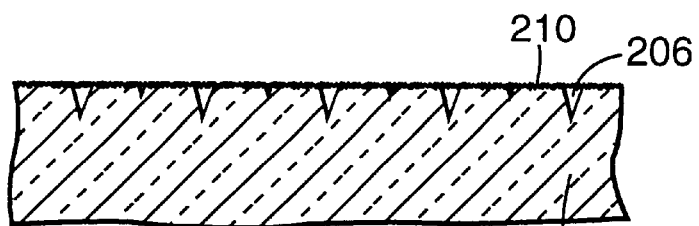
FIG. 10 is a cross-sectional view taken along line 10—10 on FIG. 3.

FIG. 10 is a cross-sectional view taken along line 10—10 on FIG. 3. FIG. 10 shows the window 200 after grinding in which the scratches 206 are now of lesser depth due to the grinding operation. The ground or abraded surface of the window is illustrated by 210.

Figure 11:
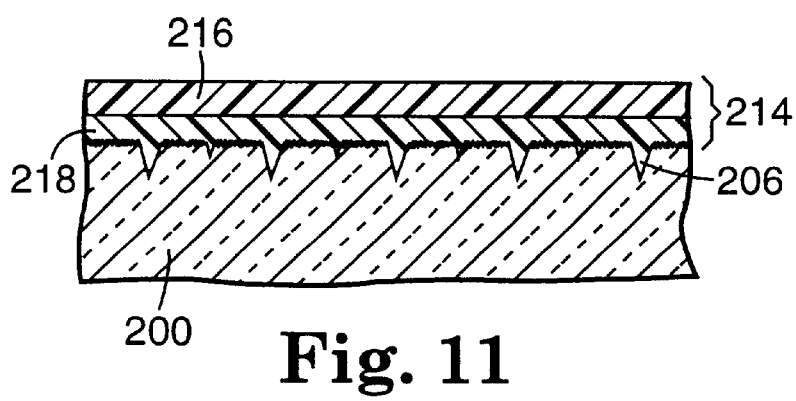
FIG. 11 is a cross-sectional view taken along line 11—11 on FIG. 7.

FIG. 11 is a cross-sectional view taken along line 11—11 on FIG. 7. The first bonding layer 218 and second substrate 216 are bonded to the glass. The first bonding layer 218 has flowed into the scratches 206.

Figure 12:
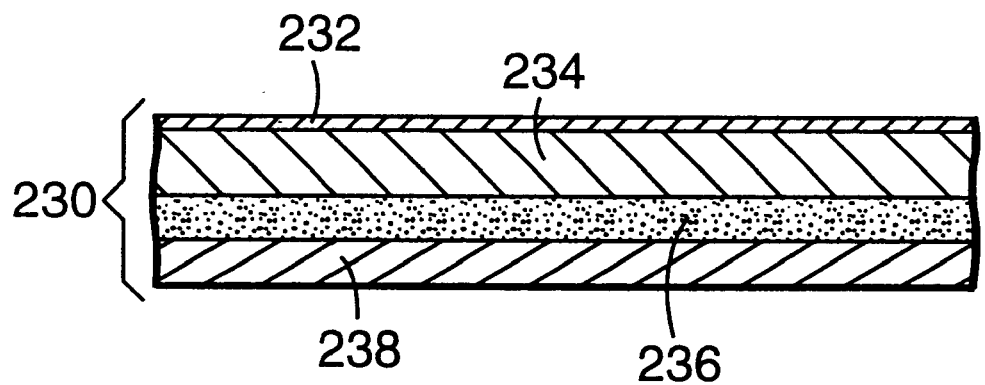
FIG. 12 is a cross-sectional view of a coated film 230.

FIG. 12 is a cross-sectional view of a coated film 230. The coated film 230 comprises a hard coat (release layer) 232, a plastic film second substrate 234, a first bonding layer 236 and a plastic release liner 238.

Figure 13:
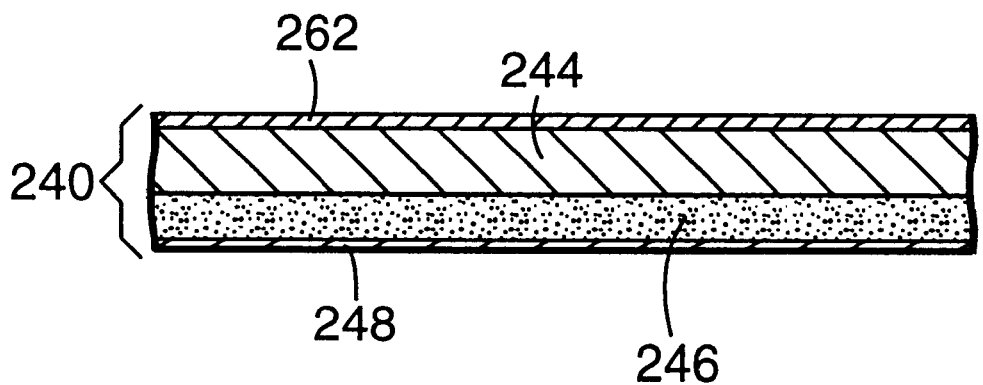
FIG. 13 is a cross-sectional view of a coated film 240.

FIG. 13 is a cross-sectional view of a coated film 240. The coated film comprises a hard coat (release layer) 262, a plastic film second substrate 244, a first bonding layer 246, and a water soluble detackification layer 248.

Figure 14:
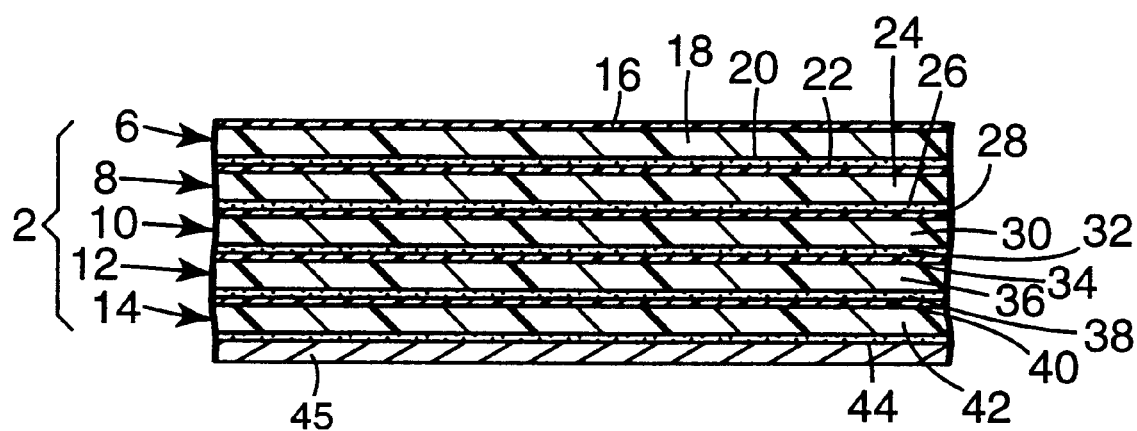
FIG. 14 is cross-sectional view of an optically clear stack of sheets, article 2

FIG. 14 is cross-sectional view of an optically clear stack of sheets, article 2. The article 2 comprises a stack of five sheets (6, 8, 10, 12, and 14) bonded together. Sheet 6, which is the topmost sheet in FIG. 14, comprises a top release layer 16, inner film layer 18, and lower second bonding layer 20. Sheet 8 comprises top release layer 22, inner film layer 24, and lower second bonding layer 26. Sheet 10 comprises top release layer 28, inner film layer 30, and lower second bonding layer 32. Sheet 12 comprises top release layer 34, inner film layer 36, and lower second bonding layer 38. Sheet 14, which is the bottom sheet of article 2, comprises top release layer 40, inner film layer 42, and lower second bonding layer 44. Also shown is an optional release liner 45.

Figure 15:
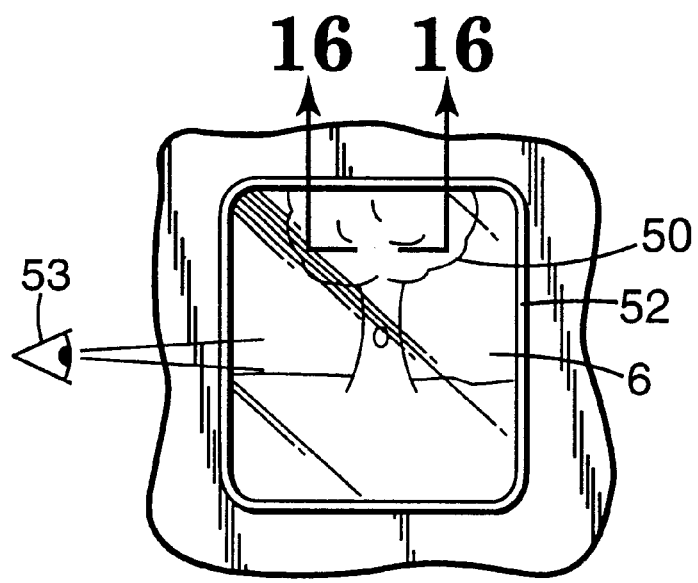
FIG. 15 is a plan view of a construction comprising article 2 on article 214 which is on window 200.

FIG. 15 is a plan view of a construction comprising article 2 of the invention on article 214 which is on window 200. An observer 53 can view a tree 50 through the window 200 which has been repaired by article 214 of the invention and protected by article 2. A rim 52 extends around the window 200. Those items not shown are illustrated in FIG. 16.

Figure 16:
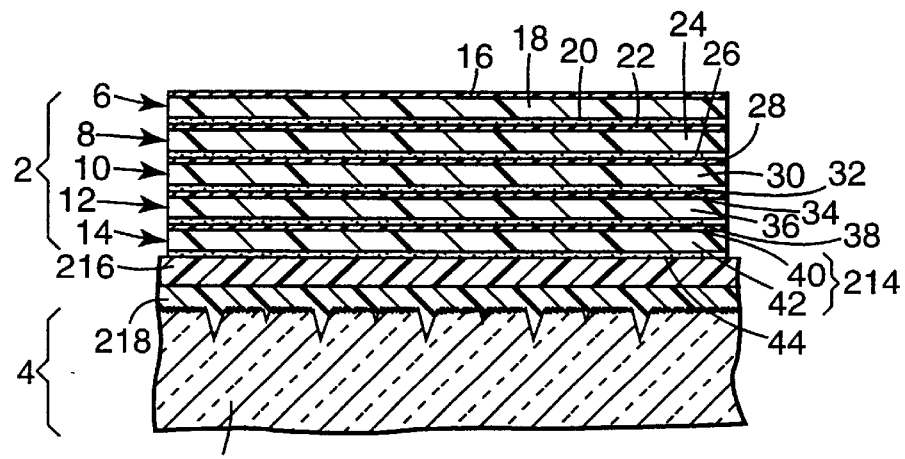
FIG. 16 is a cross-sectional view of FIG. 15 along line 16—16.

FIG. 16 is a cross-sectional view of FIG. 15 along line 16—16. The optically clear stack of separable sheets, article 2, has been applied to article 214 that had been applied to the damaged window 200.

Figure 17:
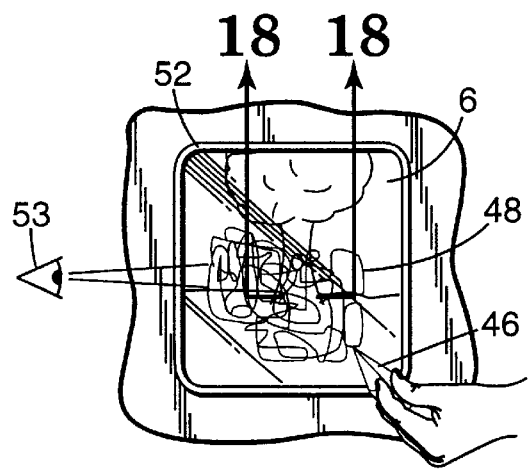
FIG. 17 illustrates a plan view of the construction of FIG. 15 wherein the top sheet 6 of the article 2 is being damaged by scratches 48 with a rock 46.

FIG. 17 illustrates a plan view of the construction of FIG. 15 wherein the top sheet 6 of the article 2 is being damaged by scratches 48 with a rock 46.

Figure 18:
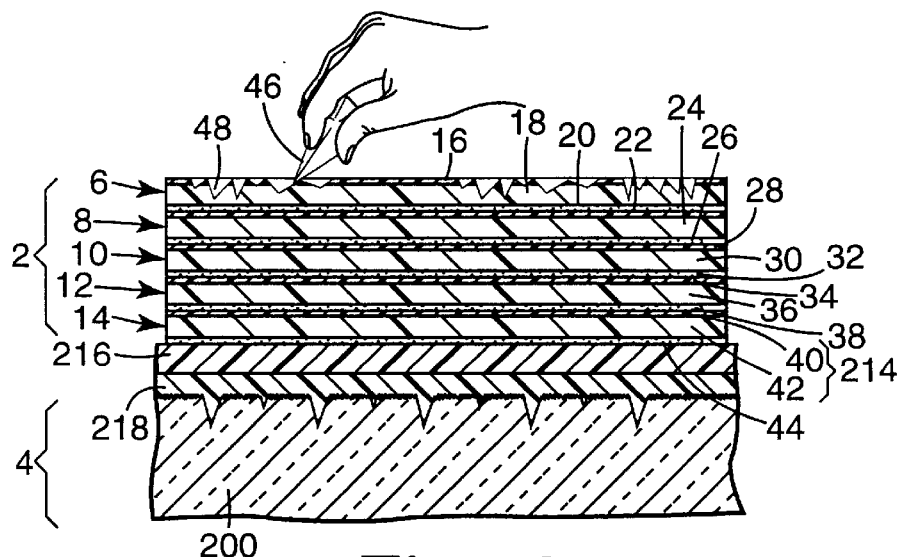
FIG. 18 is a cross-sectional view taken along line 18—18 on FIG. 17.

FIG. 18 is a cross-sectional view taken along line 18—18 on FIG. 17. FIG. 18 shows the topmost sheet 6 being scratched 48 by rock 46.

Figure 19:
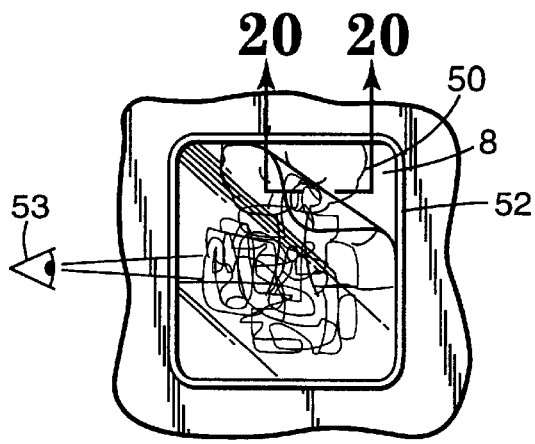
FIG. 19 illustrates a plan view of the construction of FIG. 15 wherein the damaged sheet 6 is being peeled away to reveal an undamaged sheet 8.

FIG. 19 illustrates a plan view of the construction of FIG. 15 wherein the damaged sheet 6 is being peeled away to reveal an undamaged sheet 8.

Figure 20:
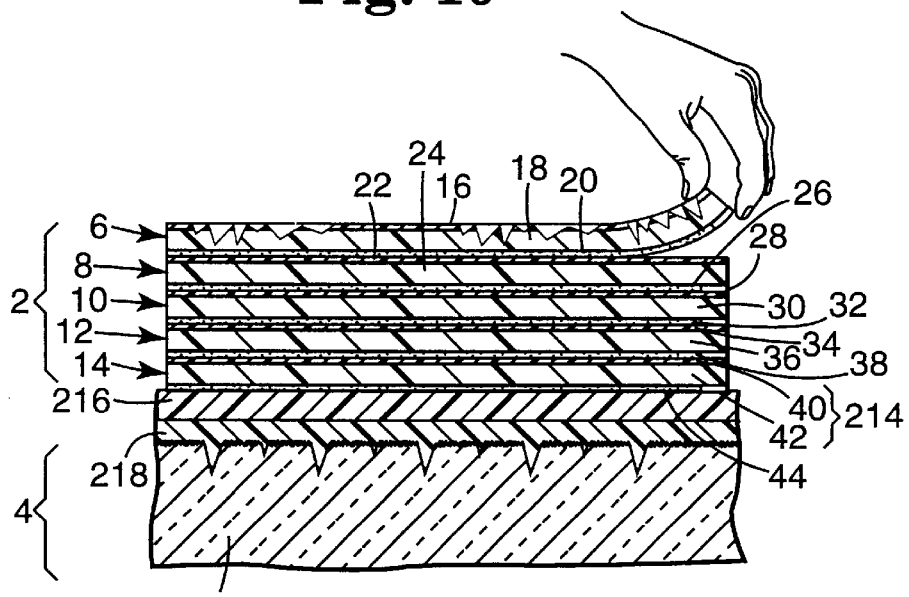
FIG. 20 is a cross-sectional view taken along line 20—20 on FIG. 19 showing a person peeling away the damaged topmost sheet 6 to reveal a new topmost sheet 8.

FIG. 20 is a cross-sectional view taken along line 20—20 on FIG. 19 showing a person peeling away the damaged topmost sheet 6 to reveal a new topmost sheet 8.

Figure 21:
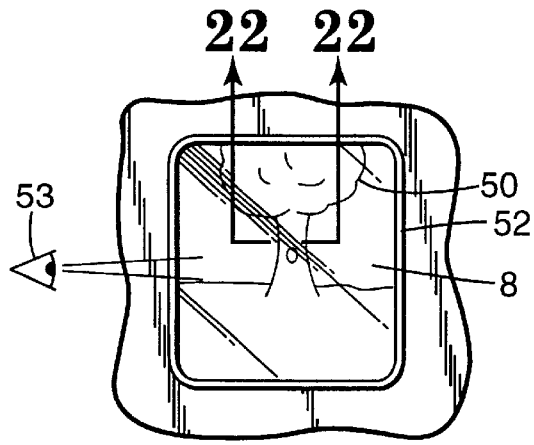
FIG. 21 illustrates how the observer 53 can now clearly view the tree 50 after the damaged sheet 6 of FIG. 19 has been removed and undamaged sheet 8 has been revealed.

FIG. 21 illustrates how the observer 53 can now clearly view the tree 50 after the damaged sheet 6 of FIG. 19 has been removed and undamaged sheet 8 has been revealed.

Figure 22:
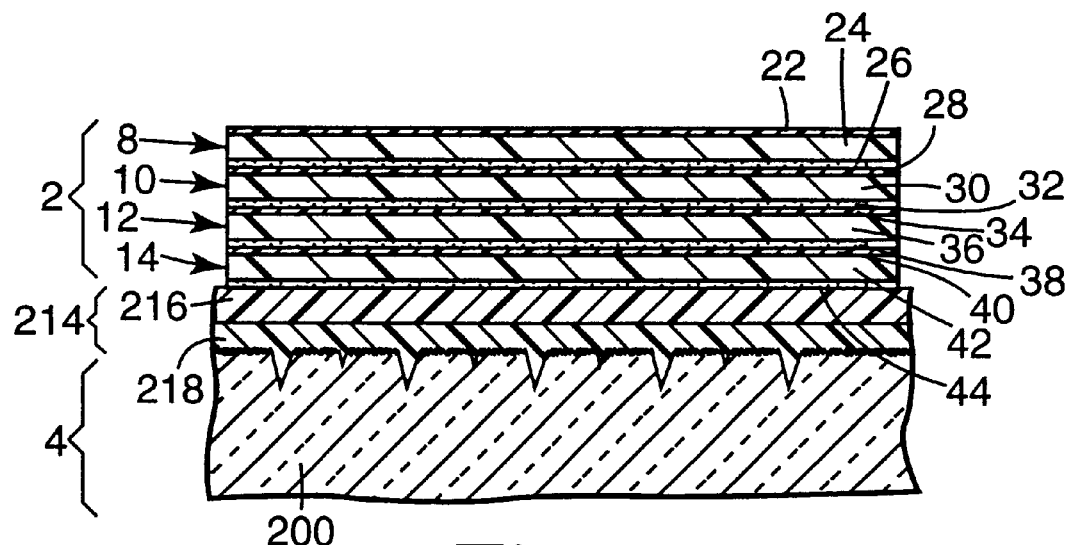
FIG. 22 is a cross-sectional view taken along line 22—22 in FIG. 21 showing a now four sheet stack which is undamaged wherein the topmost sheet is now sheet 8.

FIG. 22 is a cross-sectional view taken along line 22—22 in FIG. 21 showing a now four sheet stack which is undamaged wherein the topmost sheet is now sheet 8. FIG. 22 is identical to FIG. 16 except that the topmost sheet 6 has been removed.

Figure 23:
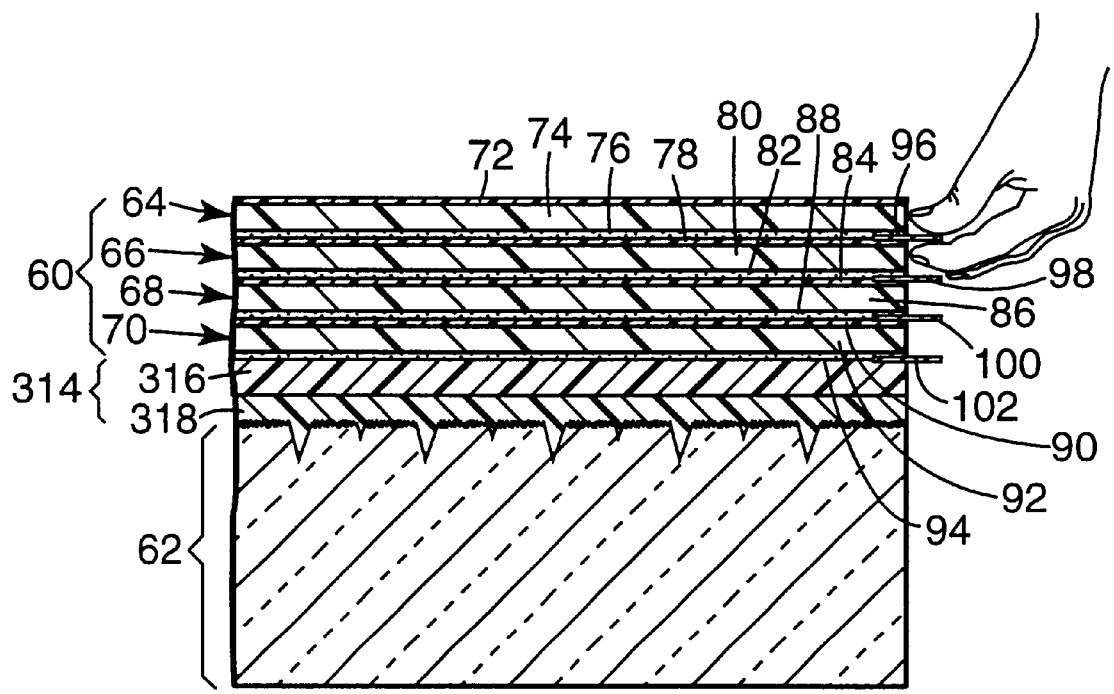
FIG. 23 is a cross-sectional view of FIG. 24B along line 23—23
Figure 24:
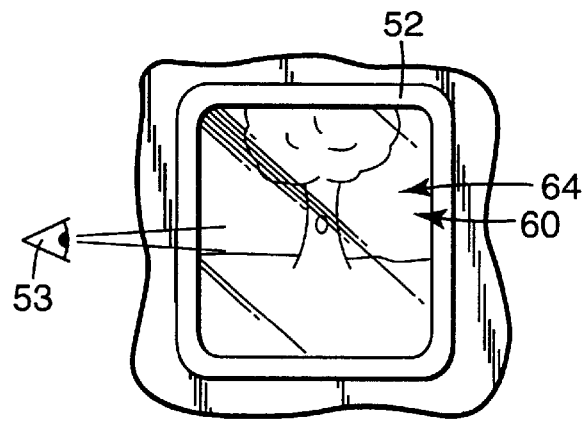
FIG. 24 is a plan view of a construction comprising article of the invention 60 bonded to article 314, which is bonded to glass window pane 62 (shown in FIG. 23).
Figure 24A:
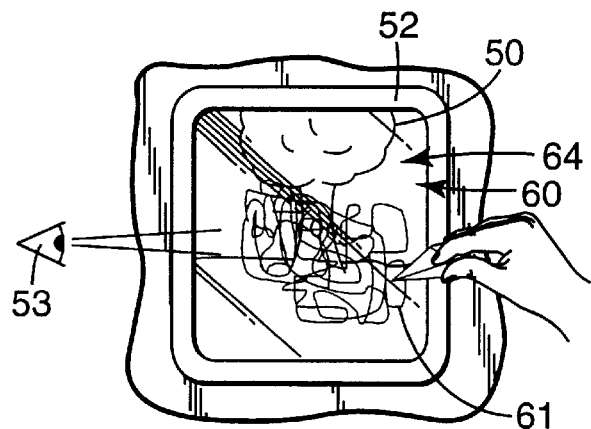
FIG. 24A illustrates a plan view of the article construction of FIG. 24 wherein the topmost sheet 64 of the article is being damaged by a rock 46. Scratches 61 are shown.
Figure 24B:
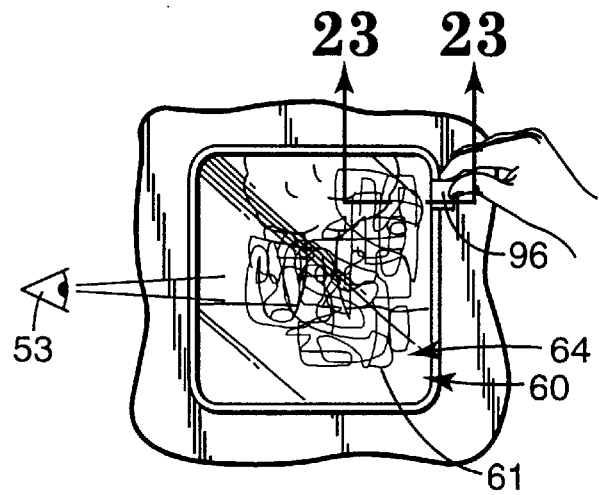
FIG. 24B illustrates a plan view of the construction of FIG. 24A wherein the frame 52 has been removed to expose the tab 96 and wherein the topmost damaged sheet 64 is being peeled away to reveal an undamaged sheet 66 using tab 96.

FIG. 23 is a cross-sectional view of FIG. 24B along line 23—23. The article 60 comprises a stack of four sheets (64, 66, 68, and 70) bonded together. Sheet 64, which is the topmost sheet, comprises top release layer 72, inner film layer 74, and lower second bonding layer 76. Sheet 66, comprises top release layer 78, inner film layer 80, and lower second bonding layer 82. Sheet 68, comprises top release layer 84, inner film layer 86, and lower second bonding layer 88. Sheet 70, which is the bottom layer of an article 60, comprises top release layer 90, inner film layer 92, and lower second bonding layer 94. Article 314 comprising of a first bonding layer 318 and a second substrate 316 and was used to repair the window. Tabs 96, 98, 100 and 102 are positioned between the sheets 64, 66, 68 and 70 between such that they are bonded to the second bonding layer of sheet above the tab.

FIG. 24 is a plan view of a construction comprising article of the invention 60 bonded to article 314, which is bonded to glass window pane 62 (shown in FIG. 23). A window comprises a window pane and the framework in which the window pane is situated. Frame 52 which covers tabs (96,98,100,102) is attached to the framework of the window. An observer 53 can view a tree 50 through window 62 and article 60. A rim 52 extends around the window.

FIG. 24A illustrates a plan view of the article construction of FIG. 24 wherein the topmost sheet 64 of the article is being damaged by a rock 46. Scratches 61 are shown.

FIG. 24B illustrates a plan view of the construction of FIG. 24A wherein the frame 52 has been removed to expose the tab 96 and wherein the topmost damaged sheet 64 is being peeled away to reveal an undamaged sheet 66 using tab 96.

Figure 25:
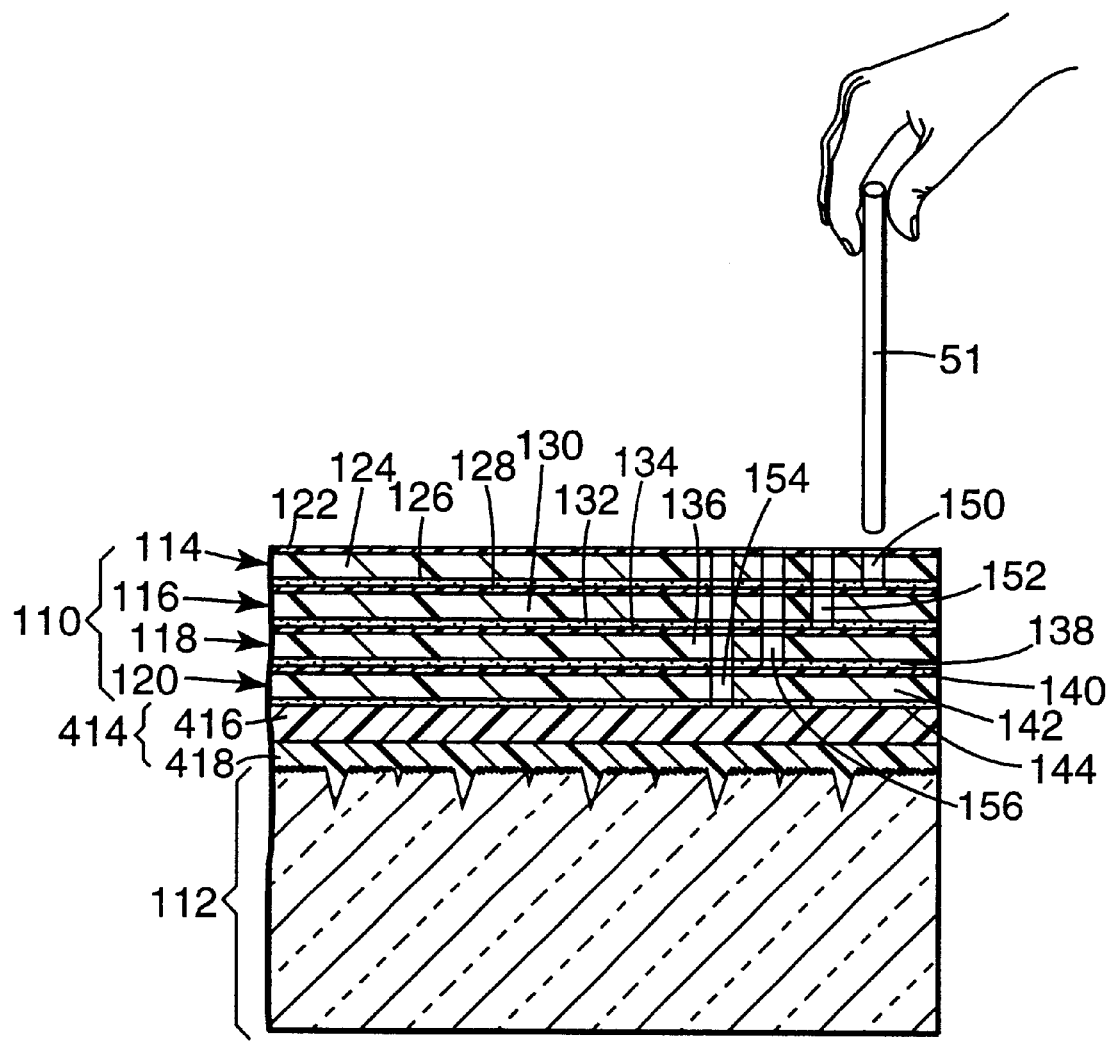
FIG. 25 is a cross-sectional view taken along line 25—25 of FIG. 26B.
Figure 26:
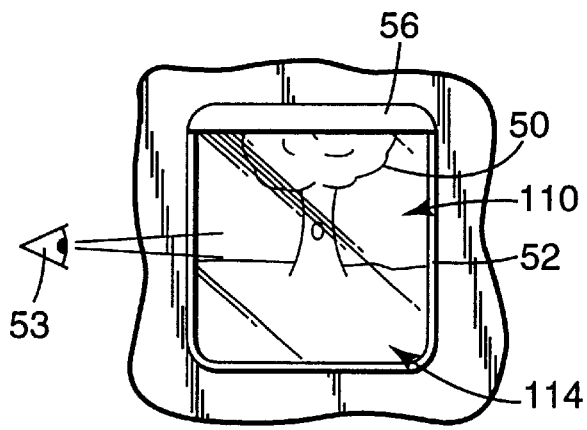
FIG. 26 is a plan view of the construction comprising article 110 on article 414 used to repair the surface of the window pane 112 (shown in FIG. 25).
Figure 26A:
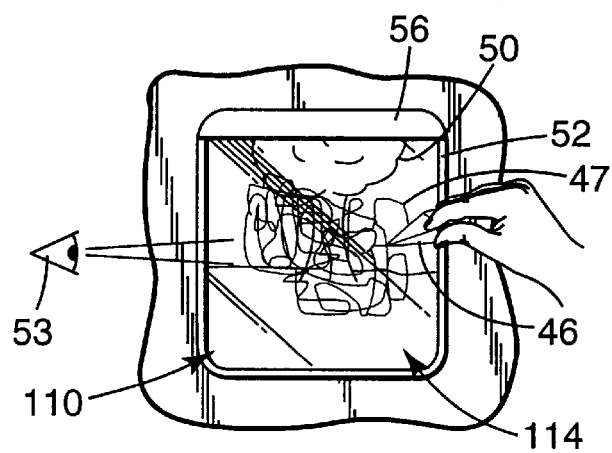
FIG. 26A illustrates a plan view of the construction of FIG. 26 wherein the topmost sheet of the article is being damaged by a rock 46. The scratches are identified as 47.
Figure 26B:
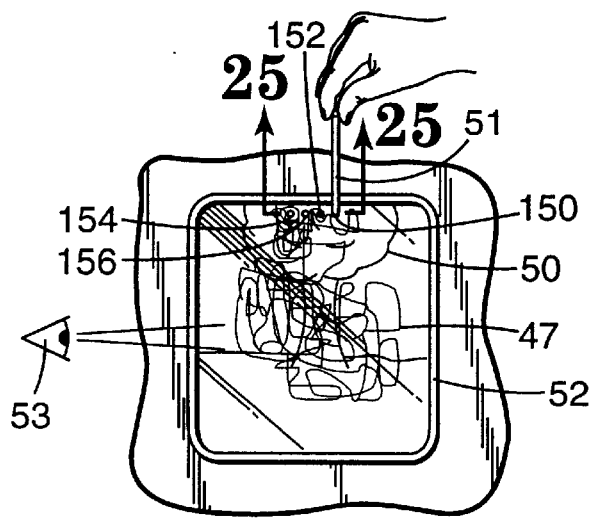
FIG. 26B illustrates a plan view of the construction of FIG. 26A wherein the frame 56 has been removed an the damaged topmost sheet 114 is about to be peeled away to reveal an undamaged sheet 66 (not shown).

FIG. 25 is a cross-sectional view taken along line 25—25 of FIG. 26B. The article of the invention 110 is bonded via bonding layer 144 to article 414 which was used to repair glass window 112 The article 110 comprises a stack of four sheets (114, 116, 118, 120) bonded together. Sheet 114, which is the topmost sheet, comprises top release layer 122, inner film layer 124, and lower second bonding layer 126. Sheet 116, comprises top release layer 128, inner film layer 130, and lower second bonding layer 132. Sheet 118, comprises top release layer 134, inner film layer 136, and lower second bonding layer 138. Sheet 120, which is the bottom sheet, comprises top release layer 140, inner film layer 142, and lower second bonding layer 144. Through holes 154, 156, 152, and 150 which are created in the stack of sheets 114, 116, 118, and 120 after the stack was prepared. They are staggered along a margin of the article when viewed from above the topmost sheet. Tool 51 is inserted in the holes to facilitate removal of the top sheet.

FIG. 26 is a plan view of the construction comprising article 110 on article 414 used to repair the surface of the window pane 112 (shown in FIG. 25). An observer 53 can view a tree 50 through the window 112, article 414, and article 110. A rim 52 extends around the window. Frame 56 is attached to the window frame and extends over through holes 53, 55, 57, and 59 (shown in FIG. 25).

FIG. 26A illustrates a plan view of the construction of FIG. 26 wherein the topmost sheet of the article is being damaged by a rock 46. The scratches are identified as 47.

FIG. 26B illustrates a plan view of the construction of FIG. 26A wherein the frame 56 has been removed an the damaged topmost sheet 114 is about to be peeled away to reveal an undamaged sheet 66 (not shown). Tool 51 is inserted in the hole and is used to initiate the peel of topmost sheet 114.

EXAMPLES

The present invention will be better understood by referring to the following non-limiting examples. All parts, percentages, ratios, etc. in the examples are by weight unless indicated otherwise.

The foregoing detailed description and Examples have been given for clarity of understanding only. No unnecessary limitations are understood therefrom. The invention is not limited to the exact details shown and described, for variations obvious to one skilled in the art will be included within the invention defined by the claims.

Example 1

A second bonding material solution comprising 96 parts by weight of isooctyl acrylate and 4 parts by weight of acrylamide was prepared in a 50% heptane/50% ethyl acetate solution using 2,2'-azobis(isobutyronitrile) free radical initiator available under the trademark "VAZO" 64 from the E.I. DuPont Company, of Wilmington, Del.

The following components were added to a reaction vessel: 19.2 kg of isooctyl acrylate, 0.8 kg of acrylamide, 40 kg of heptane and 40 kg of ethyl acetate. While constantly stirring under a nitrogen atmosphere and controlling the temperature between 70–100° C., 270 grams of VAZO™ 64 was added to the vessel in three 90-gram increments. The resulting polymer had a conversion of 98%. The Brookfield viscosity was measured (#3 spindle at 12 rpm) at 2000–2800 cps at a solids level of 19–23%. The inherent viscosity of the polymer was 1.25–1.40 dl/gram.

A first sheet of film with a tacky first second bonding layer was prepared by coating the second bonding material solution onto a second surface of a 15 cm×100 cm×125 micron thick optically clear biaxially oriented corona treated polyester film using a knife coater at a wet thickness of 175 microns. The second surface of the film was the corona treated surface of the film. The coated film was dried in an air convection oven for 10 minutes at 82° C. The dry thickness of the coating of the coated film was 20–25 microns. The tacky second bonding layer of this first sheet was protected by laminating an optically clear silicone coated polyester film to the tacky second bonding layer. The silicone coated polyester film was 1-2 PESTRD (P1)-7200 available from DCP Lohja Inc. of Lohja Calif. The surface opposite the second bonding layer coated surface of the film will be referred to herein as the release surface.

A second sheet of film with a tacky second bonding layer was prepared in a similar manner. The second bonding layer of the second sheet was laminated to the release surface of the first sheet using a laminator with a steel roll and a rubber backup roll having a shore A hardness of 75 at a pressure of 32 N/cm$^2$ such that the second bonding layer of the second sheet was in contact with the release surface of the first sheet. This sheet preparation and lamination process was repeated until a stack of four sheets was completed.

Example 2

Example 2 was identical to Example 1 except that the corona treated polyester film was 170 microns in thickness.

Example 3

Example 3 was identical to Example 1 except that the corona treated polyester film was 75 microns in thickness.

Example 4

Example 4 was identical to Example 1 except that the corona treated polyester film was 250 microns in thickness and the size of the corona treated polyester film was 15 cm×25 cm.

Example 5

Example 5 was identical to Example 1 except that a sufficient number of sheets were made and laminated together until a stack of 10 sheets was prepared.

Example 6

Example 6 was identical to Example 1 except that the film onto which the second bonding material solution was coated was a 175 micron polyester film with a hard coating on the first surface which served as the release layer. This film and coating was obtained from the Furon Corporation of Worcester, Mass. under the product name 007 PET/0270x Hard coat. In addition, the side of the film opposite the release layer was corona treated prior to coating with the second bonding material described in Example 1.

Example 7

A polished 22 cm×28 cm×250 micron thick film of clear transparent polycarbonate was obtained from General Electric under the tradename Lexan™ FR60. The film had a first surface and an opposite second surface. The film was coated on its first surface with a solution of 3M 906 hard coat, an acid-resistant acrylic based protective coating available from 3M Company, St Paul, Minn. in order to provide a release layer and an abrasion resistant surface on one side of the film. The coating solution was made by diluting to 16% solids 906 hard coat with a 50/50 mixture of isopropanol and n-butanol. To 100 grams of the diluted hardcoat solution, 0.075 gram of a leveling agent Dow 57, an alkoxy terminated polysilicone available from Dow Corning of Midland, Mich. was added. The coating was applied with a syringe to the first surface of the film in a vertical position approximately 10 microns wet. The sheet was dried 10 minutes at 82 degrees C. The coating on the film was cured with a 300 Watt high pressure mercury vapor lamps at a belt speed of approximately 30 meters per minute. The reflective parabolic lamp housing focused the light source on the coating. The curing unit was Model II 180133 AN from RPC Industries of Plainview, Ill. The resulting thickness of the hard coat was 1–2 microns.

A second bonding material was prepared from 96 parts by weight of isooctyl acrylate and 4 parts by weight of acrylamide in a 50% heptane/50% ethyl acetate solution using VAZO™ 64 initiator as follows.

To a reaction vessel the following materials were added: 19.2 kg of isooctyl acrylate, 0.8 kg of acrylamide, 40 kg of heptane and 40 kg of ethyl acetate. While constantly stirring under a nitrogen atmosphere and controlling the temperature between 70–100° C., 270 grams of VAZO™ 64 was added to vessel in three 90 gram increments. The resulting polymer solution had a conversion of 98%. The Brookfield viscosity was measured (#3 spindle at 12 rpm) at 2000–2800 cps at a solids level of 20%. The inherent viscosity of the polymer solution was 1.40 dl/gram.

The polymer solution was coated on 15 cm×30 cm×50 micron thick optically clear biaxially oriented silicone coated optically clear polyester film (transfer film) using a knife coater at a wet thickness of 175 microns. The silicone coated polyester was 1–2 PESTRD (P1)-7200 from DCP Lohja Inc. of Lohja Calif. The coated film was dried in an air convection oven for 10 minutes at 82° C. in order to form a transfer tape. The dry thickness of the coated layer was 20–25 microns. The coating was considered to be a second bonding layer. The transfer tape was laminated to the non-hard coated surface of the Lexan™ FR60 sheet via the second bonding layer of the transfer tape. Any excess Lexan™ FR60 sheet and transfer tape were trimmed so that the trimmed laminate had areas with complete coating of the second bonding layer. Four of these trimmed laminates were prepared.

A stack of sheets was produced by removing the optically clear polyester release film from the second bonding layer of the first trimmed laminate and laminating it to the release coated surface of the second trimmed laminate using a laminator with a steel roll and a rubber backup roll with a shore A hardness of 75 at a pressure of 32 N/cm$^2$. The optically clear polyester release film was removed from the third trimmed laminate and the third trimmed laminate was laminated to the release coated surface of the first two trimmed laminates. This was repeated until a stack of four trimmed laminates was produced.

Example 8

Example 6 was repeated except the second bonding layer was comprised of polyhexene. The film onto which the second bonding material layer was coated was a 175 micron thick optically clear polyester with a 0270x hard coat as described in Example 6 from the Furon Corporation of Worcester, Mass.

A second bonding material was prepared using a polyhexene with an inherent viscosity of 3.0 dl/gram. The polyhexene was prepared using a process described in U.S. Pat. No. 5,644,007 issued on Jul. 1, 1997 and assigned to 3M Company. The polyhexene was prepared using 0.2–0.3 g of a Ziegler-Natta catalyst Lynx™ 715 per kg of monomer. Lynx™ 715 is $TiCl_4$ supported on $MgCl_2$ powder which is commercially available from Catalyst Resources Inc. This catalyst is discussed in Boor, Ziegler-Natta *Catalysts and Polymerizations,* "Polymerization of Monomers," Ch. 19, pp. 512–562, *Academic.* The conversion rate was 15%. The second bonding material was coated on the surface of the film opposite the release layer of the film.

Example 9

Four layers of Scotch™ 375 packaging tape from 3M Company in St. Paul, Minn. were laminated together using a laminator with a steel roll and a rubber backup roll with a shore A hardness of 75 at a pressure of 32 N/cm². Each layer of tape was 10 cm×15 cm and comprised a 50 micron biaxially oriented polypropylene backing and a 37 micron rubber based adhesive coated on one surface thereof. The adhesive on the bottom sheet of the stack was protected by a silicone coated optically clear polyester release liner. The polyester release liner was 1–2 PESTRD(P1)-7200 from DCP Lohja Inc. of Lohja Calif. The liner was removed from each tape and the tapes were laminated together such that the adhesive layer of one tape was in contact with the film layer of the tape below except for the bottom piece of tape.

The stack of sheets are illustrated by Example 1–8 and Comparative Example 9 and were subjected to various tests. The tests and the results obtained are reported in the table below.

TABLE

| | Example 1 | Example 2 | Example 3 | Example 4 | Example 5 | Example 6 | Example 7 | Example 8 | Comparative Example 9 |
|---|---|---|---|---|---|---|---|---|---|
| 1. Effect of Sample of Visual Acuity (meter/meter) | 6/6 | 6/6 | 6/6 | 6/6 | 6/6 | 6/6 | 6/6 | 6/6 | 6/12 |
| 2. Penetration Resistance (kg) | 1.0 | 1.0 | 0.5 | 1.5 | 1.0 | 1.0 | 1.5 | 1.5 | 0.5 |
| 3. Taber Abrasion Resistance (% haze difference between abraded and non abraded samples after 100 cycles of abrasion on a Tabor Abrader) | 18 | 18 | 18 | 18 | 18 | 2 | 2 | 0.3 | 17 |
| 4. Scratch Resistance (Cycles) | 59 | 110 | 10 | 208 | 59 | 115 | 125 | 115 | 3 |
| 5. Haze % | 3.8 | 2.8 | 2.3 | 4.1 | 3.3 | 2.9 | 3.0 | 2.9 | 7.5 |
| 6a. Appearance After 120 hours at 23° C. and 180 Degree Peel Adhesion between a Second bonding layer of a Sheet and the Surface of an Adjacent Supported Film. (grams/2.54 cm) | 735 | 585 | 940 | Not tested | 735 | 207 | 889 | 73 | 207 |
| 6b. Appearance of sample after 120 hours at 23° C. and observations of the surface where sheet was removed. (No change = no residue on removal, no blisters in the sample and no discoloration) | No change | No change | No change | Not tested | No change | No change | No change | No change | No change |
| 7a. Appearance after Heat Aging (120 hours at 23° C.) and 180 Degree Peel Adhesion Between a Second bonding layer of a Sheet and the Surface of an Adjacent Supported Film. (g/2.54 cm) | 833 | 695 | 980 | Not tested | 833 | 683 | 889 | 132 | 683 |
| 7b. Appearance of sample after 120 hours at 80° C. and observation of surface where sheet was removed. (No change = no residue on removal, no blisters in the sample and no discoloration) | No change | No change | No change | Not tested | No change | 5% residue small blisters no dis- coloring | 15% residue large blisters no dis- coloring | No change | 5% residue small blisters no dis- coloring |
| 8a. Appearance After Continuous Exposure to Condensing Humidity (120 hours at 33° C. and 100% R.H.) and 180 Degree Peel Adhesion between a Second bonding layer of a Sheet and the Surface of an Adjacent Supported Film. (g/2.54 cm) | 865 | 685 | 1025 | Not tested | 865 | 268 | 927 | 69 | 268 |
| 8b. Appearance of sample after 120 hours at 38° C./100% RH and observation of surface where sheet was removed. (No change = residue on removal, no blisters in the sample and no discoloration). | No change | No change | No change | Not tested | No change | No change | Small blisters | No change | No change |
| 9a. Appearance After an Environmental Cycling Test and 180 Degree Peel Adhesion between a Second bonding layer on a Sheet Sample and the Surface of a Supported Adjacent Film. Adhesion between sheets after 5 thermal cycles (g/2.54 cm) One thermal cycle consists of 4 hours at 80° C., 4 hours at 38° C. and 100% R.H. and 16 hours at −40° C. | 815 | 655 | 1120 | Not tested | 815 | 357 | 575 | 73 | 357 |
| 9b. Appearance of sample after 5 thermal cycles and observation of surface where sheet was removed. (No change = no residue on removal, no blisters in the sample and no discoloration). | No change | No change | No change | Not tested | No change | 5% residue small blisters no dis- coloring | 15% residue large blisters no dis- coloring | No change | 5% residue small blisters no dis- coloring |

Example 10

A 30 cm×30 cm piece of laminated safety glass from Hillcrest Glass in Minneapolis, Minn. was scratched with a carbide tipped scribe from General Tools Manufacturing Company Inc. New York, N.Y. Four scratches were made in the safety glass on one side thereof. The scratches, which were each approximately straight and each approximately 25 cm long were positioned approximately parallel to each other at spacing of approximately 1.25 cm. The $R_{max}$ of the scratched surface ranged from 16–49 microns. A rotary grinder with a water center feed using a 125-micron flexible diamond abrasive disk under the tradename 3M™ Flexible Diamond Products from 3M Company in St. Paul, Minn. was used to grind down the area over and surrounding the scratches. The speed of the rotary grinder was 2400 rpm. The abrasive disk was 12.7 cm in diameter. The pressure applied to the abrasive disk was 160 Newtons and the abrasive disk was held at a 4 degree angle to the horizontal. The abraded surface of the glass was characterized using a profilometer manufactured by the Mahr Corporation of Cincinnati, Ohio (Model: Perthometer M4P). The $R_{max}$ and $R_a$ of the abraded surface were measured. The $R_{max}$ or the maximum peak to valley height in the abraded region was measured in the range of 6–13 microns. The $R_a$ of the abraded area or the arithmetic mean of the departures of the roughness profile from the mean line was measured to be 0.60–0.71 microns using the profilometer.

A first bonding material solution comprising 96 parts by weight of isooctyl acrylate and 4 parts by weight of acrylamide was prepared in a 50% heptane/50% ethyl acetate solution using 2,2'-azobis(isobutyronitrile) free radical initiator available under the trademark designation "VAZO™ 64" from the E.I. DuPont Company.

The following components were added to a reaction vessel: 19.2 kg of isooctyl acrylate, 0.8 kg of acrylamide, 40 kg of heptane and 40 kg of ethyl acetate. While constantly stirring under a nitrogen atmosphere and controlling the temperature between 70–100° C., 270 grams of VAZO™ 64 was added to the vessel in three 90-gram increments. The resulting polymer had a conversion of 98%. The Brookfield viscosity was measured (#3 spindle at 12 rpm) at 2000–2800 cps at a solids level of 19–23%. The inherent viscosity of the polymer was 1.25–1.40 dl/gram.

A second substrate with a first bonding layer coated on one side thereof was prepared by coating the first bonding material solution described above on a 15 cm×100 cm×125 micron thick optically clear biaxially oriented corona treated polyester film using a knife coater at a wet thickness of 175 microns. The sample was dried in an air convection oven for 10 minutes at 82° C. The dry thickness of the coating on the coated substrate was 20–25 microns. The tacky first bonding layer of this coated substrate was protected by laminating an optically clear silicone coated polyester film to the tacky first bonding layer. The linear used was 1–2 PESTRD (P1)-7200 from DCP Lohja Inc. of Lohja Calif.

An appropriate size piece of the second substrate coated with first bonding layer and protective silicone coated polyester film was cut out in order to test the stress relaxation of the first bonding material. The silicone coated protective film was removed. The stress relaxation of the first bonding layer was measured to be 65% using the "Stress Relaxation Test Procedure for Inherently Tacky First Bonding Layers".

The haze of the abraded glass through the abraded region was measured. The haze of the abraded glass ranged from 60–65%. A 50 mm×50 mm sample of the first bonding material coated on the polyester film was applied onto the abraded glass surface, after removing the protective silicone coated protective film, using a 0.5% Joy™ dishwashing detergent available from Procter and Gamble, Cincinnati, Ohio/99.5% water solution at the interface between the polyester second substrate coated with the first bonding layer and the glass. The polyester second substrate coated with the first bonding layer was placed coated side down on the glass. The extra solution was pressed out of the interface between the coated film and the glass with a squeegee. The second substrate and the first bonding layer were allowed to dwell for 72 hours and the haze through the polyester/first bonding layer/glass laminate assembly was measured to be 4.8%.

An appropriate size piece of the second substrate coated with first bonding layer and protective silicone coated polyester film was cut in order to test the 180° peel adhesion to glass using the "180° Peel Adhesion to Glass-Procedure Used when First Bonding Layer is Inherently Tacky." The silicone coated protective film was removed. The 180 Degree Peel Adhesion to glass of the coated polyester was 950 g/2.54 cm wide sample and no residue was observed upon removal. Visual acuity was measured through the polyester/first bonding material/glass laminate assembly at 6 meter/6 meter.

This "ScratchVisibility" was measured at 2.

Example 11

Example 10 was replicated except that the second substrate/first bonding material combination was applied to the abraded glass panel without using the dishwashing detergent and water interface. The second substrate first bonding layer combination was applied to the abraded area of the same abraded piece of safety glass as in Example 1 but not on top of the second substrate/first bonding layer combination of Example 1. This was possible due to the fact that the abraded area of the piece of glass was much larger than the substrate/first bonding layer combination for both Examples 1 and 2. The second substrate and first bonding layer combination was allowed to dwell on the glass for 72 hours and the resulting haze was measured to be 4.4%. The Visual Acuity was measured at 6 meter/6 meter. The 180° peel adhesion to glass using "180° Peel Adhesion to Glass-Procedure used when First Bonding Layer is Inherently Tacky" was 950 g/2.54 cm and no residue was observed on the panel. The stress relaxation of the first bonding material was evaluated by providing an appropriate sized piece of first bonding material/second substrate combination. The stress relaxation was measured at 65% using the test "Stress Relaxation Test Procedure Used When First Bonding Layer is Inherently Tacky".

Example 12

A scratched polycarbonate sheet approximately 300 mm×600 mm×13 mm with scratch depths up to 250 microns was provided. The numerous scratches which were random in direction and length covered most of one side of the window. The scratched polycarbonate sheet was abraded to a uniform textured surface. The grinder used was a Flex™ LW 603VR with a center water feed distributed by Braxton-Bragg Corp. Knoxville Tenn. The backup pad was a 3M ™ Stick-It™ Disc Pad CWF (approximately 12.7 mm in diameter). The surface was prepared by a three step abrasion process. The deep scratches were removed by using a 3M™ Imperial ™ Microinishing Film—100 micron grade. The grinder speed was approximately 2200 revolutions per minute. The pressure of the grinder was manual pressure ranging from 1–40 Newtons. The angle of the grinder pad to the polycarbonate substrate varied from parallel to 10 degrees off the parallel. The surface of the polycarbonate sheet was kept saturated with water to reduce friction and to minimize dust. The second step was conducted dry using a 60 micron grade of $_3$M™ Imperial™ Microfinishing film using the speed, pressure and angle in the first step. The third step was conducted dry using a 40 micron grade of 3M™ Imperial TM Microfinishing film using the speed, pressure and angle in the first step. The surface roughness of the abraded polycarbonate was characterized by an $R_{max}$ of 1.4–7.5 microns and an $R_a$ of 0.16–1.1 microns. The haze of the abraded polycarbonate was 65–82%. A second substrate with a first bonding layer coated thereon as described in Example 1 was applied to the abraded polycarbonate using the procedure outlined in Example 1. The second substrate/first bonding layer sample was allowed to dwell on the polycarbonate for 72 hours and the haze measured through the second substrate/first bonding layer/polycarbonate laminate was measured to be 8.5%.

Example 13

A second substrate coated with first bonding material which was covered with a protective silicone coated polyester film as described in Example 10 was prepared. The protective release liner was removed and the bonding surface was coated with a water-soluble cellulosic coating using a knife coater. The formulation of the cellulosic coating was 1.6 parts by weight Methocel™ (A15 LV) methocellulose from the Dow Chemical Co. of Midland, Mich. and 98.4 parts by weight of distilled water. The methocellulose was dissolved in the water such that the viscosity of the solution was 15 centipoise using a Brookfield viscometer with a #1 spindle at a rotation rate of 60 rpm. The wet thickness of the coating was 25 microns and the dry thickness of the coating was 5 microns. The film with the cellulosic treated first bonding layer was applied to the same abraded safety glass from Example 10 (in an area where no other second substrate/first bonding material combinations had been bonded) with the dishwashing detergent and water technique described in Example 10. After a 72 hour dwell on the abraded glass panel, the haze was measured to be 4.4%. The stress relaxation of the first bonding material was measured at 65% following the test "Stress Relaxation Procedure Used When the First Bonding Layer is Coated with a Water Soluable Detackifying Layer". The Visual Acuity through the second substrate/first bonding layer/glass laminate was measured at 6 meter/6 meter.

The 180° peel adhesion to glass of the second substrate/first bonding layer combination was determined following be procedure given in the Test Methods except that the sample was allowed to dwell at room temperature for 72 hours prior to testing. The 180° peel adhesion to glass was measured using the " 180 Degree Peel Adhesion to Glass-Procedure Used When the First Bonding Layer is Coated with a Water-Soluable Detackifying Layer." The values ranged from 580–1650 g/2.54 cm wide sample (areas that were moist had lower adhesion). No residue was observed on the glass after removal.

Example 14

A polymer solution to be used in making a first bonding material comprising isooctyl acrylate and acrylic acid in a 90/10 ratio by weight was prepared in ethyl acetate using benzoyl peroxide as a thermal initiator. The following components were added to a reaction vessel: 18.0 kg of isooctyl acrylate, 2.0 kg of acrylamide, and 80 kg of ethyl acetate. While constantly stirring under a nitrogen atmosphere and controlling the temperature between 70–100° C., 45 grams of benzoyl peroxide was added to vessel in three 15 gram increments every 2 hours. The resulting polymer had a conversion of 95%. The Brookfield viscosity was measured (#3 spindle at 12 rpm) at 6000 cps at a solids level of 20%. The inherent viscosity of the polymer was 1.80 dl/gram. The resulting polymer had a conversion of more than 95%.

The first bonding material solution was coated on a corona treated side of a 15 cm×50 cm×125 micron optically clear biaxially oriented polyester film using a knife coater at a wet thickness of 225 microns. The coating was dried in an air convection oven for 10 minutes at 82° C. The dry thickness of the coating layer was 25–35 microns. The tacky first bonding layer coating was protected by laminating an optically clear silicone coated polyester film to the first bonding layer. The stress relaxation of the first bonding material layer was measured to be 45% using the "Stress Relaxation Test Procedure Used When the First bonding layer is Inherently Tacky". The initial haze of the abraded glass ranged from 60–65%. A 50 mm×50 mm sample of the first bonding layer coated on the polyester film was cut and the protective liner was removed. The coated polyester was applied onto the same glass surface which had been abraded with a 125 micron diamond abrasive described in Example 1 using a 0.5% Joy™ detergent and water solution at the interface between the coated polyester and the glass in an area where no other second substrate/first bonding material combinations had been bonded. The excess solution was forced out of the interface using a squeegee. After a 72-hour dwell on the glass surface the haze through the second substrate/first bonding layer/glass laminate was measured to be 8.8%. The 180° peel adhesion to glass was measured using the "180 Degree Peel Adhesion to Glass-Procedure Used When First Bonding Layer is Inherently Tacky." The 180° peel adhesion was 1850 g/2.54 cm wide sample and only a slight adhesive residue (less than 5%) was observed on the glass upon removal of the coated polyester. The Visual Acuity was measured at 6 meter/6 meter.

Example 15

This Comparative Example demonstrates the importance of first bonding material in obtaining a final article with the desired haze value.

This Comparative Example 15 compares a first bonding layer that had low viscoelastic flow properties and thus lower stress relaxation due to crosslinking compared to the first bonding material of Example 14 which had a higher stress relaxation value.

Example 14 was repeated with the following exceptions: The first bonding material solution was crosslinked with a bis-amide crosslinker. To the first bonding material solution, 3.0 percent of 5% bis-amide crosslinker solution in toluene was added and stirred with a propeller mixing blade for 5 minutes. The wet coating thickness of the first bonding material was 225 microns. The coating was baked for 10 minutes at 75° C. to evaporate the majority of the solvent and baked 2 minutes at 100° C. to accelerate the crosslinking of the coating. The dried coating thickness was 25–35 microns. The stress relaxation of the first bonding layer was measured at 15% when conducted using the "Stress Relaxation Test Procedure Used When the First Bonding Layer is Inherently Tacky". The haze through the second substrate/first bonding material layer/glass laminate after a 72 hour dwell using the procedure described in Example 1 was 27%.

The Visual Acuity was measured at 6 meter/15 meter. The 180° peel adhesion to glass was measured using the " 180 Degree Peel Adhesion to Glass-Procedure Used When First Bonding Layer is Inherently Tacky." The 180° peel adhesion was 125 g/2.54 cm wide sample and no residue was observed on removal of the second substrate/first bonding material combination. The first bonding material apparently did not have the flow properties needed to restore optical clarity of the glass after a dwell time of 72 hours as evidenced by the haze value.

Example 16

Example 1 was repeated except that the first bonding layer was coated on the non-hard coated surface of a 175 micron optically clear polyester film with a 10 micron hard coat. The hard coated polyester film was obtained from the Furon Corporation of Worcester Mass. under the product name 007PET/0270X Hard coat. The second substrate/first bonding layer combination was applied to the abraded area of the same abraded piece of safety glass as in Example 1 but not on top of any other second substrate/first bonding layer combination. The stress relaxation of the first bonding layer was measured at 71% when conducted the "Stress Relaxation Test Procedure Used When the First Bonding Layer is Inherently Tacky." The haze through the polyester/first bonding layer/glass laminate after 72 hours using the procedure described in Example 1 was 5.6%. The 180° peel adhesion to glass was 457 g/2.54 cm wide. The adhesion was measured using the "180 Degree Peel Adhesion to Glass-Procedure Used When First Bonding Layer is Inherently Tacky." No adhesive residue was observed upon removal of the polyester/first bonding layer combination. The Visual Acuity was measured at 6 meter/6 meter.

Example 17

Example 10 was repeated with the following exceptions:

The first bonding layer used was a polyhexene and the second substrate film used was a 175-micron thick optically clear polyester with a 10 micron hard coat. The first bonding layer was coated on the non-hard coated surface of the polyester film. The hard coated film was obtained from the Furon Corporation of Worcester, Mass. under the product name 007PET/0270X.

A first bonding layer was prepared using a polyhexene with an inherent viscosity of 3.0 dl/gram. The polyhexene was prepared using a process described in U.S. Pat. No. 5,644,007, issued on Jul. 1, 1997 and assigned to 3M Company, incorporated by reference herein. The polyhexene was prepared using 0.2–0.3 g of a Ziegler-Natta catalyst Lynx™ 715 per kg of monomer. Lynx™ 715 is $TiCl_4$ supported on $MgCl_2$ powder and is commercially available from Catalyst Resources Inc. This catalyst is discussed in Boor, Ziegler-Natta Catalysts and Polymerizations, "Polymerization of Monomers," Ch. 19, pp. 512–562, Academic. The conversion rate was 15%. The first bonding material was coated on the non-hard coated surface of the polyester film using a knife coater with a gap of 15 mils. The coating was dried 10 minutes at 80° C. The dry thickness of the coating was 50 microns.

The second substrate first bonding material combination was applied to the abraded area of the same abraded piece of safety glass as in Example 1 but not on top of another second substrate/first bonding material combination. The stress relaxation of the first bonding layer was measured at 59% when conducted using the "Stress Relaxation Test Procedure Used When the First Bonding Layer is Inherently Tacky." The haze of the sample applied to the abraded panel after a 72 hour dwell at room temperature using the procedure described in Example 1 was 5.5%. The 180° peel adhesion to glass was 153 g/2.54 cm wide sample. The adhesion was measured using the "180 Degree Peel Adhesion to Glass-Procedure Used When First Bonding Layer is Inherently Tacky". No adhesive residue was observed on removal. The Visual Acuity was measured at 6 meter/6 meter.

Example 18

First, 90 grams of isooctyl acrylate, 10 grams of acrylic acid and 0.24 gram of Irgacure™ 651 (available from the Ciba Specialty Chemicals Corporation of Tarrytown N.Y.) were added to a clear approximately 0.2 liter glass jar. A glass pipet was fastened to a nitrogen gas line with a rubber hose and the pipet was inserted into the solution. The nitrogen was allowed to bubble in the solution for 10 minutes to remove the majority of oxygen in the solution. The pipet was removed and the jar was covered with an airtight lid. The jar was swirled in front of a UV light source for about 10 seconds or until the Brookfield viscosity of the solution was approximately 1500–3000 cps. (Light source= F15T8/350BL 15 watt bulb from General Electric). To this solution 5 grams of 1,6-hexanediol diacrylate was added and stirred into the reactive first bonding material mechanically until the solution was homogenous. The solution was allowed to sit at room temperature for 3 hours to allow bubbles to flow to the surface.

The stress relaxation of the cured first bonding layer was measured at 40% using the procedure outlined for the "Stress Relaxation Procedure When First Bonding Layer is Comprised of a Reactive Liquid".

To make a laminate article, approximately 5 grams of the same solution was applied to the same 30 cm×30 cm glass that was abraded with a 125 micron diamond abrasive as described in Example 1. It was applied to an area that did not have another sample applied thereto. A corona treated 125 micron×15 cm×10 cm optically clear polyester film was applied on top of the solution with the corona treated surface adjacent to the reactive first bonding layer. The reactive first bonding layer was squeezed between the abraded glass panel and the polyester film using a roller such that a substantial area of the glass panel was covered by both the first bonding layer and the polyester film. The reactive first bonding layer was cured by placing the reactive glass panel under a UV light source so light penetrated through the polyester for 5 minutes (light source=F40/350BL–2 bulbs at a distance of 6 cm from the sample). The haze through the polyester film/ reactive first bonding layer/glass laminate was measured to be 3.5%. The 180° peel adhesion was measured using the "180° Peel Adhesion to Glass Procedure Used When First Bonding Layer is comprised of a Reactive Liquid". The 180° peel adhesion to glass was measured at 170 g/2.54 cm width. The Visual Acuity through the polyester film/reactive first bonding layer/glass laminate was measured to be 6 meter/6 meter. The "Scratch Visibility" was measured to be 1.

Example 19

An article comprising a stack of removable sheets was prepared as follows:

A second bonding material solution comprising 96 parts by weight of isooctyl acrylate and 4 parts by weight of acrylamide was prepared in a 50% heptane/50% ethyl acetate solution using 2,2'-azobis(isobutyronitrile) free radical initiator available under the trademark "VAZO" 64 from the E.I. DuPont Company.

The following components were added to a reaction vessel, 19.2 kg of isooctyl acrylate, 0.8 kg of acrylamide, 40 kg of heptane and 40 kg of ethyl acetate. While constantly stirring under a nitrogen atmosphere and controlling the temperature between 70–100° C., 270 grams of VAZO™ 64 was added to the vessel in three 90-gram increments. The resulting polymer had a conversion of 98%. The Brookfield viscosity was measured (#3 spindle at 12 rpm) at 2000–2800 cps at a solids level of 19–23%. The inherent viscosity of the polymer was 1.25–1.40 dl/gram.

A first sheet comprises a layer of film with a tacky second bonding layer was prepared by coating the second bonding material solution on the corona treated surface of a 15 cm×100 cm×125 micron thick optically clear biaxially oriented polyester film using a knife coater at a wet thickness of 175 microns. The second bonding material was coated on the side of the film which was corona treated. The sample was dried in an air convection oven for 10 minutes at 82° C. The dry thickness of the coated layer was 20–25 microns. The tacky second bonding layer of this coated film was protected by laminating an optically clear silicone coated polyester release liner to the tacky second bonding layer. The release liner used was 1-2 PESTRD(P1)-7200 form DCP Lohja Inc. of Lohja Calif. The surface opposite the second bonding layer coated surface of the film will be referred to herein as the release surface.

A second sheet comprising a film with a tacky second bonding layer was prepared in a similar manner. The second sheet was laminated to the release surface of the first sheet using a laminator with a steel roll and a rubber backup roll having a shore A hardness of 75 at a pressure of 32 N/cm². This sheet preparation and lamination process was repeated until a stack of four sheets was completed. In this case the composition of the first bonding layer and the second bonding layer is the same. The bottom most sheet in the stack has is coated with the first bonding layer that flows into the scratched or abraded glass panel The stack of sheets was applied to the same abraded glass that was described in Example 10 with the same detergent and water solution at the interface using a roller but not over another sample. After 72 hours at room temperature the first bonding layer flowed into the abraded glass and restored clarity to the glass. The % haze after 72 hours of dwell time was recorded at 5.9%. The Visual Acuity through the stack of sheets on the abraded glass was 6 meter/6 meter.

The adhesion to glass of the stack of sheets by the second bonding layer was measured at 220 grams/2.54 cm wide sample. No adhesive residue was observed upon removal of the stack of sheets. The stress relaxation of the first bonding material was measured at 75%.

It is claimed:

1. An article comprising:
  a laminate comprising:
  (a) a first substrate, the first substrate having a first major surface and an opposite second major surface, wherein the first substrate comprises a material selected from the group consisting of glass, plastic and combinations thereof, wherein the first substrate has at least one scratch on its first major surface defining an abraded area and wherein the abraded area of the first major surface of the first substrate has an $R_{max}$ of greater than about 1 micron;
  (b) a second substrate having a first major surface and an opposite second major surface wherein the second substrate comprises immediately before, during and after formation of the laminate a material selected from the group consisting of glass, amorphous plastic in its glassy state, amorphous plastic in its rubbery state, crystalline plastic in its glassy state, crystalline plastic in its rubbery state, and combinations thereof;
  (c) a first bonding material layer having a stress relaxation value of about 15 percent or greater positioned between the first substrate and the second substrate in a manner to form a laminate, wherein the bonding material layer at least partially fills the scratch(es) and is in contact with at least the abraded area of the first major surface of the first substrate and is in contact with at least a portion of the second major surface of the second substrate;
  (d) a stack of removable sheets bonded to the first major surface of the second substrate and/or the second surface of the first substrate;
  wherein a maximum haze value through the laminate is less than about 20 percent.

2. An article comprising:
  a laminate comprising:
  (a) a first substrate, the first substrate having a first major surface and an opposite second major surface, wherein the first substrate comprises a material selected from the group consisting of glass, plastic and combinations thereof, wherein the first substrate has at least one scratch on its first major surface defining an abraded area and wherein the abraded area of the first major surface of the first substrate has an $R_{max}$ of greater than about 1 micron;
  (b) a second substrate having a first major surface and an opposite second major surface wherein the second substrate comprises a stack of removable sheets;
  (c) a first bonding material layer having a stress relaxation value of about 15 percent or greater positioned between the first substrate and the second substrate in a manner to form a laminate, wherein the bonding material layer at least partially fills the scratch(es) and is in contact with at least the abraded area of the first major surface of the first substrate and is in contact with at least a portion of the second major surface of the second substrate;
  wherein a maximum haze value through the laminate is less than about 20 percent.

3. The article of claim 1 wherein the article when subjected to a visual acuity test using a 3 meter Snellen eye chart can allow an observer with 6 meter/6 meter vision to read a line on the eye chart which is indicative of about 6 meter/9 meter vision or better.

4. The article of claim 2 wherein the article when subjected to a visual acuity test using a 3 meter Snellen eye chart can allow an observer with 6 meter/6 meter vision to read a line on the eye chart which is indicative of about 6 meter/9 meter vision or better.

5. The article of claim 1 wherein the first substrate has an abraded and/or scratched area on its first major surface and wherein the first major surface of the first substrate has a maximum haze value of about 20 or greater.

6. The article of claim 2 wherein the first substrate has an abraded and/or scratched area on its first major surface and wherein the first major surface of the first substrate has a maximum haze value of about 20 or greater.

7. The article of claim 1 wherein the first substrate has a Scratch Visibility rating 1–2 and the laminate has a Scratch Visibility rating of 0–1.

8. The article of claim 2 wherein the first substrate has a Scratch Visibility rating 1–2 and the laminate has a Scratch Visibility rating of 0–1.

9. The article of claim 1 wherein each sheet of the stack of sheets independently comprises:
(a) a film, the film having a first side having a surface area and an opposite second side having a surface area;
(b) a second bonding layer having a first side having a surface area and an opposite second side having a surface area, wherein the second bonding layer is bonded via its first side to the second side of the film such that at least a center of the surface area of the second side of the film is in contact with the second bonding layer, wherein at least about 50 percent of the surface area of the second side of the film has the second bonding layer bonded thereto;
(c) an optional release layer coated on the first side of the film;
wherein each sheet is stacked upon another sheet such that except for a bottom sheet of the stack of sheets, the second bonding layer of a sheet is in contact with the protective film or release layer, if present, of a sheet below;
wherein a topmost sheet can be removed from the stack of sheets by pulling it away from the stack such that the sheet being removed from the stack as well as the sheets remaining with the stack do not delaminate.

10. The article of claim 2 wherein each sheet of the stack of sheets independently comprises:
(a) a film, the film having a first side having a surface area and an opposite second side having a surface area;
(b) a second bonding layer having a first side having a surface area and an opposite second side having a surface area, wherein the second bonding layer is bonded via its first side to the second side of the film such that at least a center of the surface area of the second side of the film is in contact with the second bonding layer;
wherein at least about 50 percent of the surface area of the second side of the film has the second bonding layer bonded thereto;
wherein a bottom sheet of the stack of sheets does not have the second bonding layer bonded to the second side of the film;
(c) an optional release layer coated on the first side of the film;
wherein each sheet is stacked upon another sheet such that except for a bottom sheet of the stack of sheets, the second bonding layer of a sheet is in contact with the protective film or release layer, if present, of a sheet below;
wherein a topmost sheet can be removed from the stack of sheets by pulling it away from the stack such that the sheet being removed from the stack as well as the sheets remaining with the stack do not delaminate.

11. The article of claim 9 wherein each sheet has a penetration resistance of at least about 0.5 kg.

12. The article of claim 10 wherein each sheet has a penetration resistance of at least about 0.5 kg.

13. The article of claim 9 wherein the stack of sheets comprises at least about 3 sheets.

14. The article of claim 10 wherein the stack of sheets comprises at least about 3 sheets.

15. The article of claim 9 wherein the article further comprises a plurality of tabs, wherein a separate tab is bonded to a portion of the second side of the second bonding layer of each of the sheets in a manner such that the tab on the topmost sheet can be used to pull the topmost sheet away from the stack of sheets.

16. The article of claim 10 wherein the article further comprises a plurality of tabs, wherein a separate tab is bonded to a portion of the second side of the second bonding layer of each of the sheets in a manner such that the tab on the topmost sheet can be used to pull the topmost sheet away from the stack of sheets.

17. The article of claim 9 wherein for each sheet at least a portion of a margin of the film does not have a second bonding material bonded thereto in a similar location such that the topmost sheet can be removed by grasping the portion of the film without a second bonding material bonded thereto and pulling it away from the stack.

18. The article of claim 17 wherein for each sheet the portion of the margin which does not have second bonding material bonded thereto is a corner of the sheet.

19. The article of claim 9 wherein each sheet has a hole which extends through that sheet in a margin of the sheet, wherein the holes in the sheets are staggered such that the holes do not overlap and wherein the topmost sheet can be removed from the stack of sheets by using a tool which can be inserted in the hole of the topmost sheet and used to pull the topmost sheet away from the stack.

20. The article of claim 10 wherein each sheet has a hole which extends through that sheet in a margin of the sheet, wherein the holes in the sheets are staggered such that the holes do not overlap and wherein the topmost sheet can be removed from the stack of sheets by using a tool which can be inserted in the hole of the topmost sheet and used to pull the topmost sheet away from the stack.

* * * * *